(12) United States Patent
Hoppe et al.

(10) Patent No.: US 7,071,936 B2
(45) Date of Patent: *Jul. 4, 2006

(54) SYSTEMS AND METHODS FOR PROVIDING SIGNAL-SPECIALIZED PARAMETRIZATION

(75) Inventors: Hugues Herve Hoppe, Redmond, WA (US); John Michael Snyder, Redmond, WA (US); Pedro Vieira Sander, Cambridge, MA (US); Steven Jacob Gortler, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 665 days.

This patent is subject to a terminal disclaimer.

(21) Appl. No.: 10/138,289

(22) Filed: May 1, 2002

(65) Prior Publication Data

US 2003/0206178 A1    Nov. 6, 2003

(51) Int. Cl.
*G06T 17/20* (2006.01)
(52) U.S. Cl. .................. 345/420; 345/419; 345/428; 345/581; 345/582
(58) Field of Classification Search ........... 345/428, 345/581–582, 419, 420
See application file for complete search history.

(56) References Cited

U.S. PATENT DOCUMENTS

| | | | | |
|---|---|---|---|---|
| 6,300,958 B1 * | 10/2001 | Mallet | ........................ | 345/442 |
| 2003/0206165 A1 * | 11/2003 | Hoppe et al. | ................ | 345/420 |
| 2003/0206177 A1 * | 11/2003 | Hoppe et al. | ................ | 345/582 |

OTHER PUBLICATIONS

Normal meshes, Igor Guskov, Kiril Vidimče, Wim Sweldens, Peter Schröder, Jul. 2000, Proceedings of the 27th annual conference on Computer graphics and interactive techniques.*

Meshed Atlases for Real-Time Procedural Solid Texturing, Nathan A. Carr and John C. Hart, University of Illinois, Urbana-Champaign, ACM Transactions on Graphics, vol. 21, No. 2, Apr. 2002, pp. 106-131.*

Dynamic real-time deformations using space & time adaptive sampling Gilles Debunne, Mathieu Desbrun, Marie-Paule Cani, Alan H. Barr , Aug. 2001, Proceedings of the 28th annual conference on Computer graphics and interactive techniques.*

Algorithm 817 P2MESH: generic object-oriented interface between 2-D unstructured meshes and FEM/FVM-based PDE solvers Enrico Bertolazzi, Gianmarco Manzini, Mar. 2002, ACM Transactions on Mathematical Software (TOMS), vol. 28 Issue 1.*

(Continued)

*Primary Examiner*—Jeffery Brier
*Assistant Examiner*—Javid Amini
(74) *Attorney, Agent, or Firm*—Woodcock Washburn LLP

(57) ABSTRACT

Systems and methods are provided for optimizing a parametrization scheme in accordance with information about the surface signal. A surface parametrization is created to store a given surface signal into a texture image. The signal-specialized metric of the invention minimizes signal approximation error, i.e., the difference between the original surface signal and its reconstruction from the sampled texture. A signal-stretch parametrization metric is derived based on a Taylor expansion of signal error. For fast evaluation, the metric of the invention is pre-integrated over the surface as a metric tensor. The resulting parametrizations have increased texture resolution in surface regions with greater signal detail. Compared to traditional geometric parametrizations, the number of texture samples can often be reduced by a significant factor for a desired signal accuracy.

23 Claims, 36 Drawing Sheets
(21 of 36 Drawing Sheet(s) Filed in Color)

OTHER PUBLICATIONS

Session P3: filtering and sampling: A simple algorithm for surface denoising Jianbo Peng, Vasily Strela, Denis Zorin Oct. 2001, Proceedings of the conference on Visualization '01.*

Session P1: point-based rendering and modeling: Point set surfaces Marc Alexa, Johannes Behr, Daniel Cohen-Or, Shachar Fleishman, David Levin, Claudio T. Silva, Oct. 2001, Proceedings of the conference on Visualization '01.*

AbAdjev, V., et al., "MetaStream," *VRML 1999 Proceedings*, 1999, 53-62.

Cignoni, P. et al., "A general method for recovering attribute values on simplified meshes," *IEEE Visualization*, 1998, 59-67.

Cohen, J. et al., "Appearance-preserving simplification," *SIGGRAPH*, 1998, 115-122.

Eck, M. et al., "Multiresolution analysis of arbitrary meshes," *SIGGRAPH*, 1995,173-182.

Floater, M., "Parametrization and smooth approximation of surface triangulations," *Comp. Aided Geometric Design*, 1997, 14(3), 231-250.

Garland, M. et al., "Hierarchical face clustering on polygonal surfaces," *Symposium on Interactive 3D Graphics*, 2001, 49-58.

Gortler, S. et al., "The Lumigraph," *SIGGRAPH*, 1996, 43-52.

Guskov, I. et al., "Normal Meshes," *SIGGRAPH*, 2000, 95-102.

Hinker, P. et al., "Geometric Optimization," *IEEE Visualization*, 1993, 189-195.

Hoppe, H., "Progressive Meshes," *SIGGRAPH*, 1996, 99-108.

Hormann, K. et al., "MIPS—an efficient global parametrization method," *Curve and Surface Design*, 1999, 153-162.

Hormann, K. et al., "Hierarchical parametrization of triangulated surfaces," *Vision, Modeling, and Visualization*, 1999, 219-226.

Hunter, A. et al., "Uniform frequency images: adding geometry to images to produce space-efficient textures," *IEEE Visualization*, 2000, 243-251.

Igarashi, T. et al., "Adaptive unwrapping for interactive texture painting," *Symposium on Interactive 3D Graphics*, 2001, 209-217.

Kalvin, A. et al., "SuperFaces: Polyhedral approximation with bounded error," *Image Capture, Formatting, and Display, SPIE Proceedings*, 1994, 2164, 2-13.

Kobbelt, L. et al., "A general framework for mesh decimation," *Proceedings of Graphics Interface*, 1998, 43-50.

Krishnamurthy, V. et al., "Fitting smooth surfaces to dense polygon meshes," *SIGGRAPH*, 1996, 313-324.

Lee, A. et al., "MAPS: Multiresolution adaptive parametrization of surfaces," *SIGGRAPH*, 1998, 95-104.

Lévy, B. et al., "Non-distorted texture mapping for sheared triangulated meshes," *SIGGRAPH*, 1998, 343-352.

Lindstrom, P. et al., "Fast and memory efficient polygonal simplification," *IEEE Visualization*, 1998, 279-287.

Maillot, J. et al., "Interactive texture mapping," *Computer Graphics Proceedings*, 1993, 27-34.

Maruya, M., "Generating texture map from object-surface texture data," *Eurographics '95*, 1995, 14(3), 397-405.

Milenkovic, V., "Rotational polygon containment and minimum enclosure," *Proc. of 14th ACM Symposium on Computational Geometry*, 1998, 8 pages.

Murata, H. et al., "Rectangle-packing-based module placement," *IEEE ICCAD*, 1995, 472-479.

Sander, P. et al., "Silhouette clipping," *SIGGRAPH*, 2000, 327-334.

Sloan, P.-P. et al., "Importance driven texture coordinate optimization," *Eurographics '98*, 1998, 17(3), 97-104.

Soucy, M. et al., "A texture-mapping approach for the compression of colored 3D triangulations," *The Visual Computer*, 1986, 12, 503-514.

Maruya, M., "Generating texture map from object-surface texture data," *Computer Graphics Forum (Proceedings of Eurographics '95)*, 1995, 14(3), 397-405.

Milenkovic, V., "Rotational polygon containment and minimum enclosure," *Proc. of 14th Annual Symposium on Computational Geometry*, ACM, 1998.

Peters, J. et al., "The Simplest Subdivision Scheme for Smoothing Polyhedra," *ACM Trans. on Graphics*, 1997, 16(4), 420-431.

Praun, E. et al., "Lapped Textures," *Proceedings of SIGGRAPH'00: 27th International Conference on Computer Graphics and Interactive Techniques Conference*, New Orleans, LA, Jul. 23-28, 2000.

Rabin, J.M., "The Geometry of the Super Flows," *Comms. Math. Physics*, 1991, 137(3), 533-552.

Sander, P. et al., "Silhouette clipping," *SIGGRAPH*, 2000, 327-334.

Sloan, P.-P. et al., "Importance driven texture coordinate optimization," *Computer Graphics Forum (Proceedings of Eurographics '98)*, 1998, 17(3), 97-104.

Soucy, M.et al., "A texture-mapping approach for the compression of colored 3D triangulations," *The Visual Computer*, 1986, 12, 503-514.

Wallace, R.S., "Modified Hough Transform for Lines," *Proceedings—CVPR '85, IEEE Computer Society Conference on Computer Vision and Pattern Recognition*, San Francisco, CA, Jun. 19-23, 1985, 665-667.

Briggs, W., "A Multigrid Tutorial," *SIAM*, Philadelphia, 1987.

Duchamp, T. et al., "Hierarchical Computation of PL Harmonic Embeddings," *Technical Report*, University of Washington, 1997.

Garland, M. et al., "Surface Simplification Using Quadric Error Metrics," *SIGGRAPH*, 1997, 209-216.

Haker, S. et al., "Conformal Surface Parameterization for Texture Mapping," *IEEE Trans. on Visual. and Comp. Graphics*, 2000, 6(2).

Hoppe, H., "New Quadric Error Metric for Simplifying Meshes with Appearance Attributes," *IEEE Visualization*, 1999, 59-66.

Sander, P. et al., "Texture Mapping Progressive Meshes," *SIGGRAPH*, 2001, 409-416.

Terzopolous, D. et al., "Sampling and Reconstruction with Adaptive Meshes," *CVPR*, 1991, 70-75.

Sander, P. et al, "Signal-Specialized Parametrization," *Eurographics Workshop on Rendering*, 2002, 1-11.

* cited by examiner

SYSTEMS AND METHODS FOR PROVIDING SIGNAL-SPECIALIZED PARAMETRIZATION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2001, Microsoft Corp.

FIELD OF THE INVENTION

The present invention relates to systems and methods for providing signal specialized parametrization schemes in connection with computer graphics. More particularly, the present invention relates to systems and methods for providing, parametrization using a signal specialized metric. A signal specialized metric generates a surface parametrization that takes into account a signal on the surface of a mesh, such as a color mapped onto the surface, in order to place more texture samples in area of high signal variation or high signal detail.

BACKGROUND OF THE INVENTION

Texture mapping lets a color signal be imaged onto geometry, giving the appearance of detail on coarse triangle meshes. Using textures is generally more efficient than refining the carrier geometry to represent the signal per vertex. While rasterization hardware has supported basic texture mapping for many years, it has recently begun to offer more powerful features. Multitexturing lets several textures contribute to a pixel fragment, and shader expression trees combine these textures using complex operations. In particular, the trend is towards more general programmability.

With this increased rasterization functionality, many surface signals other than color can be used to achieve new rendering effects, including bump mapping (where surface normals are the signal), displacement mapping (geometry), irradiance shading (spherical harmonics), and self-shadowing (horizon maps). These techniques provide further motivation to compress signals defined with vertex attributes into textures parametrized over the mesh.

The goal in generating the parametrization should be to minimize the signal approximation error (SAE), i.e., the difference between the reconstructed signal and the original surface signal. However, most surface parametrization schemes to date assume no a priori knowledge of the signal, and instead minimize various geometric distortion measures.

For example, Eck et al. propose the discrete harmonic map, which assigns non-uniform springs to the mesh edges. Duchamp et al. investigate multiresolution solution methods for computing harmonic maps. Floater proposes a similar metric with a different edge-spring weighting that guarantees an embedding for convex boundaries. Haker et al. compute conformal maps onto the sphere. Hormann and Greiner propose the MIPS parametrization, which attempts to preserve the ratio of singular values over the parametrization. All four of these metrics disregard absolute stretch scale over the surface, with the result that small domain areas can map to large regions on the surface.

Maillot et al. base their metric on mesh edge springs of nonzero rest length, where rest length corresponds to edge length on the surface. Lévy and Mallet use a metric that combines orthogonality and isoparametric terms.

Sander et al. focus on making textures as small as possible for an unknown surface signal. Their geometric-stretch metric minimizes undersampling by integrating the sum of squared singular values over the map. Intuitively, this measures how distances in the domain get stretched when mapped onto the surface. Commonly assigned copending U.S. patent application Ser. No. 10/901,826, entitled "Systems and Methods for Optimizing Geometric Stretch of a Parametrization Scheme," describes various aspects of such a geometric stretch metric.

Thus, most schemes for flattening a surface chart into 2D minimize a geometric distortion metric, which assumes no knowledge of the surface signal. Many of these distortion metrics are tailored for the authoring problem of mapping an existing image onto a surface mesh, rather than the problem of sampling a given surface signal. In any event, there has been relatively little work in exploiting knowledge of the surface signal in optimizing the parametrization.

With respect to sparse existing works in the area of signal-specialized chart parametrization, given an existing parametrization, Sloan et al. warp the square texture domain onto itself to more evenly distribute a scalar importance field. Terzopolous and Vasilescu approximate a 2D image using a warped grid of sample values. The warping is achieved using a dynamic simulation where grid edge weights are set according to local image content. Hunter and Cohen compress an image as a set of texture-mapped rectangles, obtained by k–d tree subdivision of the image based on frequency content.

With respect to the use of multi-chart parametrization, to avoid excessive distortion, an arbitrary mesh is generally parametrized using multiple charts. At the limit, distortion can be driven to zero by making each triangle its own chart. However, partitioning the surface into many charts has drawbacks. Such partitioning constrains mesh simplification, requires more inter-chart gutter space, leads to mipmap artifacts, and fails to exploit continuity across charts. Thus, a balance should be achieved between parametrization distortion and the drawbacks of charts. Several existing approaches, such as Eck et al., Garland et al., Krishnamurthy et al., Maillot et al. and Sander et al., directly partition the original mesh, while other schemes, such as Cignoni et al., Lee et al. and Sander, Gu et al., define the charts using mesh simplification. For an interactive 3D painting system, for example, Igarashi and Cosgrove construct charts based on the history of drawing operations. The texture resolution on a surface region is selected using the viewing resolution at the time the region was last painted.

However, each of the previously existing parametrization techniques suffer drawbacks relating to minimizing the difference between the reconstructed signal and the original surface signal, even where the signal is taken into account. The geometric approaches of Sloan et al., Terzopolous and Vasilescu, and Hunter and Cohen are inadequate because they do not take the surface geometry into account, fail to adequately capture information about signal directionality, which allows the parametrization to squash in the direction across the signal gradient and/or restrict the chart boundary to be a square. Moreover, these prior art approaches do not provide continuous solutions that adequately adapt to high frequencies along diagonal directions. Even where prior art techniques consider the signal in some respect, these techniques do not scale the charts based on this content. Thus, there is a need for improved parametrization in a computing system optimized in accordance with a surface signal metric for efficient and accurate parametrization and graphics reconstruction processes.

SUMMARY OF THE INVENTION

In view of the foregoing, the present invention provides systems and methods for optimizing a parametrization scheme in accordance with information about the surface signal. A surface parametrization is created to store a given surface signal into a texture image. The signal-specialized metric of the invention minimizes signal approximation error, i.e., the difference between the original surface signal and its reconstruction from the sampled texture. A signal-stretch parametrization metric is derived based on a Taylor expansion of signal error. For fast evaluation, the metric of the invention is pre-integrated over the surface as a metric tensor. The resulting parametrizations have increased texture resolution in surface regions with greater signal detail. Compared to traditional geometric parametrizations, the number of texture samples can often be reduced by a significant factor for a desired signal accuracy.

Other features and embodiments of the present invention are described below.

BRIEF DESCRIPTION OF THE DRAWINGS

The file of this patent includes at least one drawing executed in color. Copies of this patent with color drawings will be provided by the United States Patent and Trademark Office upon request and payment of the necessary fee.

The system and methods for optimizing geometric-stretch of a parametrization scheme in accordance with the present invention are further described with reference to the accompanying drawings in which.

DETAILED DESCRIPTION OF THE INVENTION

Overview

Figure 1A:
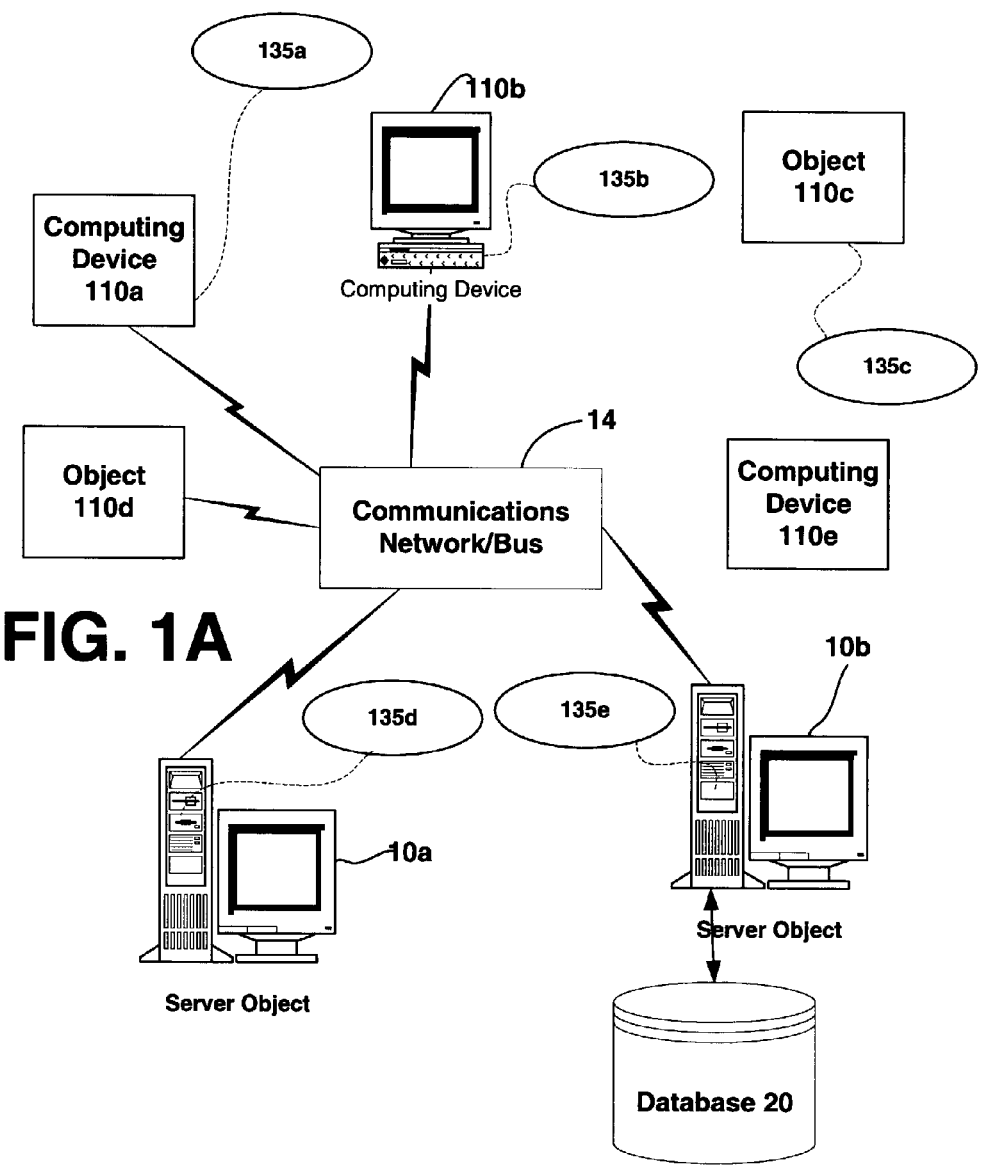
FIG. 1A is a block diagram representing an exemplary network environment having a variety of computing devices in which the present invention may be implemented.

As described in the background, there are a number of pre-existing techniques for parametrizing a surface for later reconstruction, most of which do not take the surface signal into account. In contrast to the pre-existing works of Sloan et al., Terzopolous and Vasilescu, and Hunter and Cohen, for example, the integrated metric tensor (IMT) of the invention is derived directly from signal approximation error, and is integrated over the surface. The IMT captures signal directionality, which allows the parametrization to squash in the direction across the signal gradient and does not restrict the chart boundary to be a square. Moreover, the invention considers signals mapped onto surfaces in 3D, defines the parametrization on a coarser, irregular mesh, and stores the signal in a texture image mapped onto this mesh. Additionally, the parametrization of the invention is continuous and better adapts to high frequencies along diagonal directions.

As mentioned, some techniques do take the surface signal into account in some respect. However, these techniques do not adequately address the problem continuously, over a single chart in the manner implemented by the invention. In contrast to Igarashi and Cosgrove, for example, the parametrization of the invention automatically adapts to the content of the signal, and scales the charts based on this content.

A main contribution of the parametrization of the invention is its ability to parametrize a single chart using a signal-specialized metric. To process arbitrary meshes, the invention manually delineates the surface charts as in Krishnamurthy et al., and pack their parametrizations as in U.S. patent application Ser. No. 10/138,751, except that the method(s) of the invention are applicable to any "chartification" scheme.

Thus, the problem of building a surface parametrization optimized for a specific signal by directly minimizing the signal approximation error is considered herein. To make the parametrization metric of the invention view-independent, approximation error is integrated over the surface.

A first contribution of the invention is a signal-specialized metric in connection with which (1) signal approximation error is integrated over the surface, derived using a Taylor expansion of signal error (see Appendix A), (2) during a pre-computation, each mesh face is assigned an integrated metric tensor (IMT), which encapsulates how much the signal varies over the face, and in what primary direction and (3) for fast evaluation, affine transformation rules exactly transform these triangle-based IMTs.

A second contribution of the invention is the provision of efficient parametrization algorithm(s) to minimize this metric using a multiresolution hierarchy in connection with which (1) the IMTs are computed on the fine mesh triangles, and propagated fine-to-coarse in the hierarchy, (2) the chart is parametrized using a coarse-to-fine optimization, by transforming and evaluating the IMTs, (3) the chart boundary parametrization is allowed to move during optimization, while still preserving an embedding and (4) as a post-process, the chart is relaxed to its tightest bounding rectangle, to exploit unused texture space.

The new metric and algorithm(s) are incorporated in a system for creating signal-specialized parametrizations of meshes. By allocating greater texture density to surface regions with signal detail, the resulting parametrizations reduce signal approximation error for a given texture size or permit smaller textures for a given approximation error. For examples shown in the various Figures herein, the same signal accuracy can be achieved with a factor of 3–5 savings, or greater, in texture samples compared to a signal-independent, or purely geometric based, parametrization.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with a parametrization process. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate a parametrization process that may utilize the techniques of the present invention.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10 or 110 may contain an application that might request parametrization services.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Parametrization services in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since graphical object(s) may in practice be physically located in one or more locations, the ability to distribute parametrization services is of great utility in such a system.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use Power line for connectivity. Data Services may enter the home as broadband (e.g., either DSL or Cable modem) and are accessible within the home using either wireless (e.g., HomeRF or 802.11b) or wired (e.g., Home PNA, Cat 5, even Power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to the parametrization of graphics object(s) in connection with the present invention.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 1A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 10d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process graphical object(s).

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 110a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing graphics object(s) or intermediate graphics object(s) processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 1B:
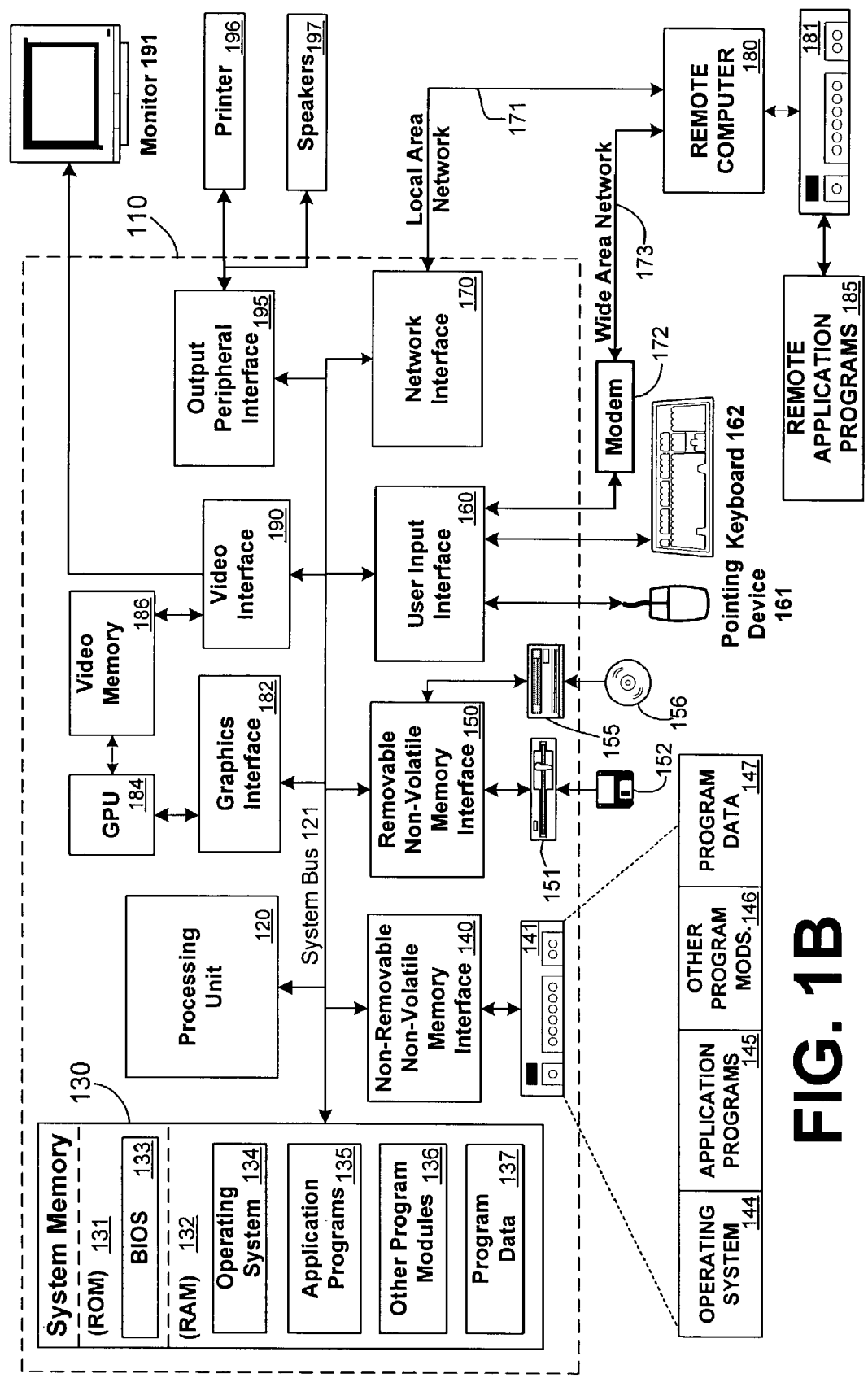
FIG. 1B is a block diagram representing an exemplary non-limiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the parametrization techniques of the invention.

Although not required, the invention can be implemented via an operating system, for use by a developer of services for a device or object, and/or included within application software that operates in connection with the parametrization of graphics object(s). Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable, nonvolatile memory interface such as interface 140, and magnetic disk drive 151 and optical disk drive 155 are typically connected to the system bus 121 by a removable, nonvolatile memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that parametrization services may be performed by, supported in or accessed via all of NET's languages and services, and in other distributed computing frameworks as well.

Signal-Specialized Parametrization

As discussed above, many authoring techniques associate signals with a surface mesh, including texture synthesis, 3D scanning, 3D painting, solid texturing, ray tracing, and procedural shading. Given such a signal, the invention converts the signal into a parametrized texture image, using the following two steps: (1) the mesh is parametrized over a 2D texture domain by assigning texture coordinates to its vertices. It is often difficult to create this parametrization as a single unfolding, so generally, with the invention, the surface is partitioned into charts, each of which is parametrized onto a region of the domain and (2) using this parametrization, the surface signal is sampled into a texture image of the appropriate resolution. Then, at runtime, hardware rasterization reconstructs the signal on each pixel fragment, typically using bilinear interpolation of the texture samples, and possibly with mipmapping and anisotropic filtering.

Figures 2A, 2B:
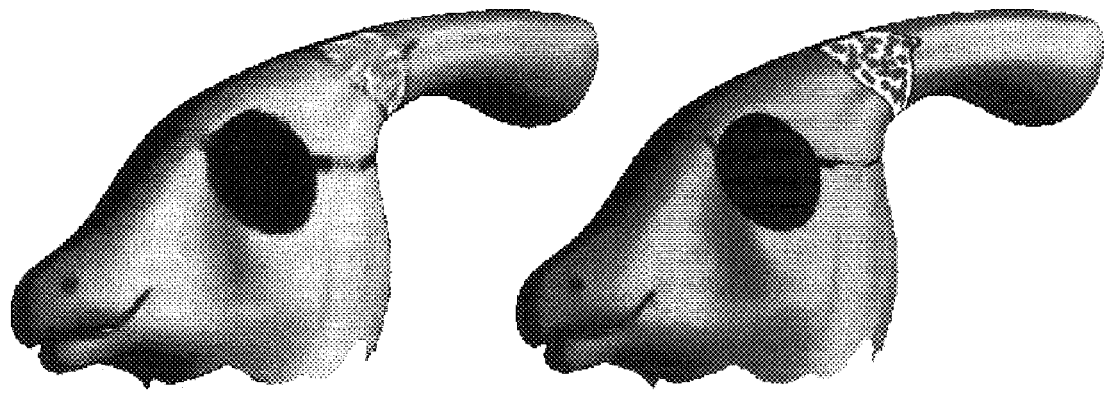
FIGS. 2A and 2B illustrate a comparison of the application of a geometric-stretch metric to the application of the signal-stretch metric of the invention.

At the outset, FIGS. 2A and 2B illustrate the advantages of the present invention over a purely geometric based approach. The parasaur of FIG. 2A was generated from a pure geometric-based metric blind to the surface signal whereas the parasaur of FIG. 2B was generated from the signal-specialized parametrization of the invention. In each case, the painted surface signal is captured into a 128×128 texture. Intuitively, one can observe that the geometric-based technique attempts to minimize geometric-stretch of the image, thereby attempting to give extra mesh detail to those areas where geometry rapidly and/or abruptly changes, e.g., at the mouth of the parasaur; however, where geometry is not rapidly and/or abruptly changing, but there is nonetheless a great amount of detail in the signal on the surface, the geometric based metric performs poorly at reconstruction. For instance, at the bandana, and the edges of the eye patch, the geometry of the parasaur head is relatively smooth, but the signal is rapidly changing, and thus the geometric metric has not performed adequately. To the contrary, the signal specialized metric of the invention directly minimizes the signal approximation error and thus reproduces the detail of the signal magnificently.

Figure 2C:
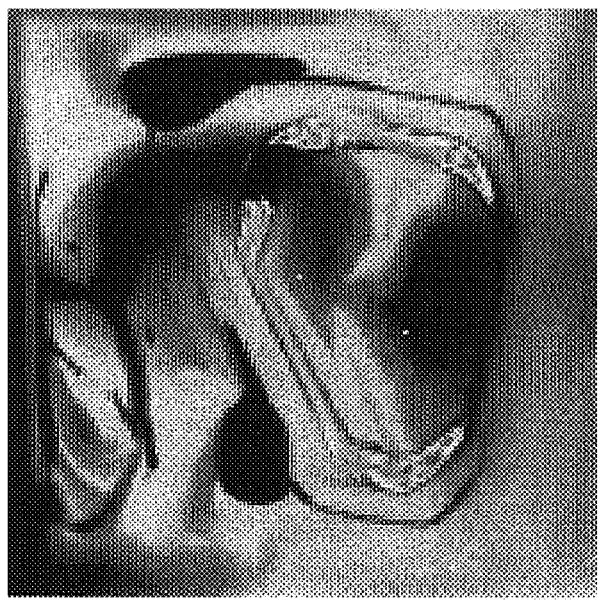
FIGS. 2C and 2D illustrate texture domain representations of the images of FIGS. 2A and 2B, respectively.
Figure 2D:
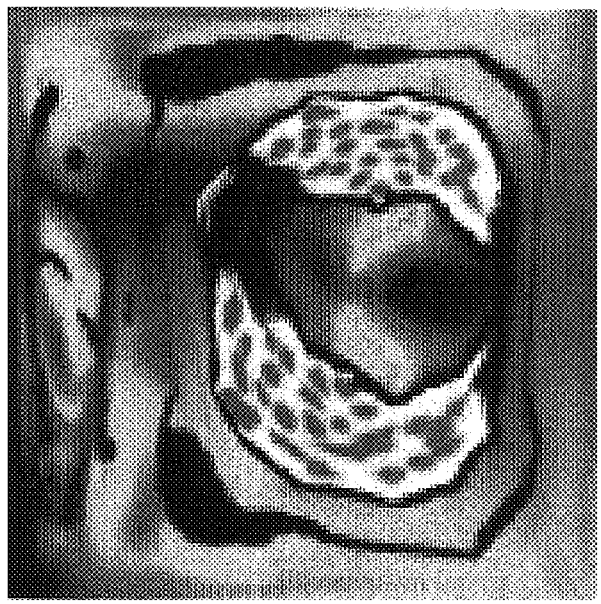

FIGS. 2C and 2D illustrate texture domain representations of the images of FIGS. 2A and 2B, respectively. One can easily see the comparatively greater informational bandwidth given to the bandana in FIG. 2D compared to FIG. 2C, and likewise the greater information given to the strap of the eye patch. These are places where the signal on the surface of the parasaur is changing rapidly, but the geometry is relatively unchanged. Accordingly, the parametrization of FIG. 2A that does not take the signal variation into account performs badly relative to the FIG. 2B parametrization of the invention.

Review of the Geometric-Stretch Metric

Commonly assigned copending U.S. patent application Ser. No. 10/138,751, filed May 1, 2002, describes a technique for optimizing the geometric-stretch of a parametrization scheme. Review of the geometric-stretch metric herein illustrates aspects of the derivation of the signal specialized metric of the invention, and thus an overview is presented below.

Figure 3A:
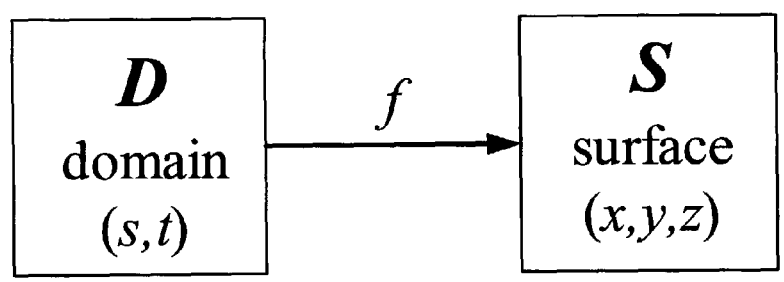
FIG. 3A illustrates the nature of the problem solved by application of the geometric-stretch metric.

To find a good parametrization $f$ of a given surface S onto a texture domain D, as shown by FIG. 3A, the geometric-stretch metric $E_f(S)$ is derived as follows:

The Jacobian of the function $f$ is:

$$J_f(s,t) = [\partial f/\partial s(s,t)\ \partial f/\partial t(s,t)] = [f_s(s,t)\ f_t(s,t)].$$

The singular values $\Gamma$ and $\gamma$ of this 3×2 Jacobian matrix represent the largest and smallest length obtained when mapping unit-length vectors from the texture domain D to the surface S, i.e., the largest and smallest local "stretch". They are obtained as:

$$\Gamma(s,t) = (\tfrac{1}{2}(a_f+c_f) + ((a_f-c_f)^2 + 4b_f^2)^{1/2})^{1/2}\ \text{max. sing. value}$$

$$\gamma(s,t) = (\tfrac{1}{2}(a_f+c_f) - ((a_f-c_f)^2 + 4b_f^2)^{1/2})^{1/2}\ \text{min. sing. value}$$

where $$\begin{bmatrix} a_f(s,t) & b_f(s,t) \\ b_f(s,t) & c_f(s,t) \end{bmatrix} = \begin{bmatrix} f_s \cdot f_s & f_s \cdot f_t \\ f_s \cdot f_t & f_t \cdot f_t \end{bmatrix} = J_f^T J_f = M_f(s,t)$$

is called the metric tensor of the function $f$ at $(s,t)$. The concept of this metric tensor is built upon during the derivation of the signal-stretch metric in accordance with the invention.

From the singular values $\Gamma$ and $\gamma$, two norms corresponding to average and worst-case local stretch are defined as:

$$L_2(s,t) = (\tfrac{1}{2}(\Gamma^2+\gamma^2))^{1/2} = (a_f+c_f)^{1/2}\ \text{and}\ L_\infty(s,t) = \Gamma.$$

The $L_2$ stretch norm can also be expressed using the trace of the metric tensor as $L_2(s,t) = (\tfrac{1}{2}\mathrm{tr}(M_f))^{1/2}$.

The squared $L_2$ stretch norm is integrated over the surface S to obtain the geometric-stretch metric:

$$E_f(S) = \iint_{(s,t)\in D} (L_2(s,t))^2 dA_S(s,t),$$

where $dA_S(s,t) = (|M_f(s,t)|)^{1/2}\,ds\,dt$ is differential surface area.

In the setting where the surface S is a triangle mesh, $f$ is piecewise linear and thus its Jacobian $J_f$ is constant over each triangle. Therefore the integrated metric can be rewritten as a finite sum as follows:

$$E_f(S) = \sum_{\Delta_i \in D} \left( \tfrac{1}{2} \mathrm{tr}(M_f(s_i,t_i)) A_S(\Delta_i) \right),$$

where $A_S(\Delta_i)$ is the surface area of triangle $\Delta_i$, and $M_f(s_i,t_i)$ is the (constant) value of the metric tensor at any point $(s_i, t_i) \in \Delta_i$.

Signal-Stretch Metric

Figure 3B:
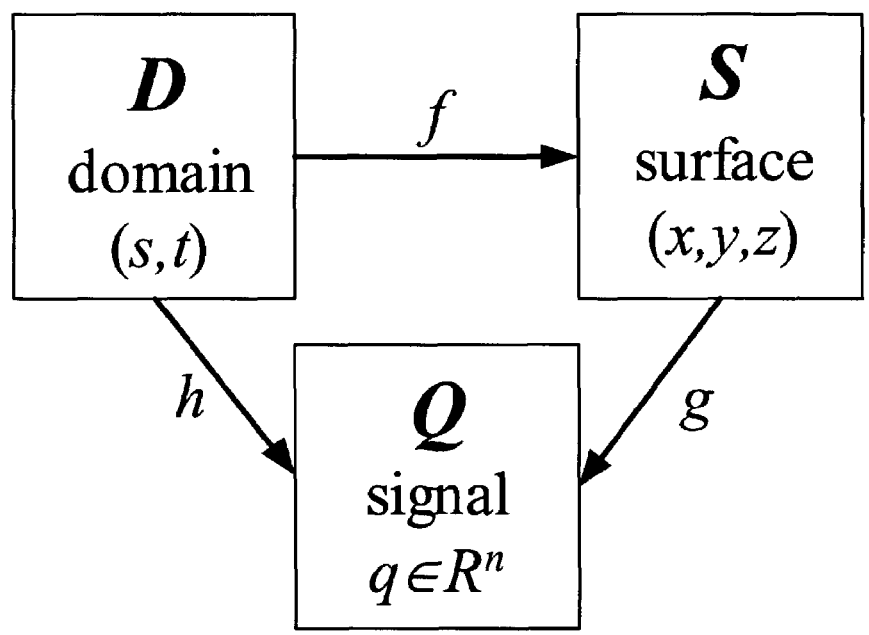
FIG. 3B illustrates the nature of the problem solved by applying the signal-stretch metric of the invention.

Unlike the geometric-stretch metric, the metric of the invention considers a signal defined on the surface. As shown by FIG. 3B, let this surface signal be denoted by the function $g : S \to Q$ where the signal-space Q can be vector-valued, e.g., red-green-blue (RGB) color is a 3-vector in Q.

To find a good surface parametrization $f$, the invention examines how well the function $h = g \circ f$ (from the texture domain D to the signal Q) is approximated when reconstructed from a discrete sampling over D. For example, if the signal Q varies greatly on a region of the surface S, and the region is not allocated adequate space in the texture domain D, then the local texture resolution on that region may be insufficient to accurately represent the signal.

In Appendix A, a metric for signal approximation error is derived, defined as the difference between h and its reconstruction $\tilde{h}$ from a discrete sampling with spacing $\delta$ in D. The derivation of the invention makes two assumptions: (1) $\tilde{h}$ is a piecewise constant reconstruction, and (2) the sampling is asymptotically dense. Under these assumptions, the squared signal approximation error at a point is:

$$E_h(s,t) = \frac{\delta^2}{3} \mathrm{tr}(M_h(s,t)),\ \text{where}\ M_h(s,t) = J_h^T J_h = \begin{bmatrix} h_s \cdot h_s & h_s \cdot h_t \\ h_s \cdot h_t & h_t \cdot h_t \end{bmatrix}$$

which is the metric tensor of the signal function h. Here, $h_s$ and $h_t$ are n-vectors where n is the dimension of the signal space Q.

The integrated squared error over the surface S is therefore:

$$E_h(S) = \frac{\delta^2}{3} \mathrm{tr}(\mathcal{M}_h(S)),\ \text{where}\ \mathcal{M}_h(S) = \iint_{(s,t)\in D} M_h(s,t) dA_S(s,t)$$

which is the integrated metric tensor (IMT) of the signal function h. Reducing this integral to a sum over domain triangles is reflected by the following:

$$\mathcal{M}_h(S) = \sum_{\Delta_i \in D} \mathcal{M}_h(\Delta_i)\ \text{where}\ \mathcal{M}_h(\Delta_i) = \iint_{(s,t)\in \Delta_i} M_h(s,t) dA_S(s,t)$$

Thus, the signal-specialized M metric $E_h(S)$ builds upon the geometric-stretch metric, neglecting the globally constant factor $\delta^2/3$, by using the metric tensor of the signal mapping h rather than the surface mapping $f$, which is why the metric of the invention is referred to herein as the signal-stretch metric.

To compute the integrated metric tensor (IMT) $M_h(\Delta_i)$ of the signal on each triangle, the invention considers two cases. First, the signal may be a piecewise linear interpolant of per-vertex attributes, for example, as in the case of an RGB color specified at each vertex. In such a case, the metric tensor $M_h(s,t)$ is constant over the triangle, like the geometric tensor $M_f(s,t)$. The IMT is thus represented by the product:

$$M_h(\Delta_i) = M_h(s_i,t_i) \cdot A_S(\Delta_i).$$

Furthermore, the Jacobian $J_h$ in $M_h = J_h^T J_h$ can be derived for a triangle whose vertices have parametrizations $p_1, p_2, p_3$ in D and signal $q_1, q_2, q_3$ in Q by solving the linear system $$(q_1\ q_2\ q_3) = (J_h\ o)\begin{pmatrix} p_1 & p_2 & p_3 \\ 1 & 1 & 1 \end{pmatrix}$$

where $o \in Q$ completes the affine transform matrix.

The second case is that of a more general signal which has more detail than can be described at vertices. One example is a detailed image projected onto the triangle mesh. In that case, the invention computes $M_h(\Delta_i)$ using numerical integration. Specifically, a number of regular 1-to-4 subdivisions are applied to the triangle, the signal is evaluated at all the introduced vertices, and then the metric tensors of the resulting piecewise linear interpolant are summed. In the examples utilized in the Figures, each mesh triangle was subdivided into 64 sub-triangles to compute the IMT.

Affine Transformation Rule for the IMT

Within the optimization algorithm described below, the invention repeatedly modifies the parametrizations (s,t) of the mesh vertices, and examines the change in the signal-stretch functional $E_h(S)$. The straightforward implementation of this is to recompute the integrated metric tensors of the mesh triangles based on the modified parametrization; however, this is prohibitive for two reasons: (1) for the case of a general (nonlinear) signal on the mesh, the IMT is computed using expensive numerical integration and (2) with the hierarchical solver of the invention, a coarse mesh face corresponds to a region of the original surface, and thus the signal is also nonlinear.

Fortunately, modifying the parametrization results in an affine transform of each mesh triangle, so the IMT of a transformed triangle can be exactly computed from its original IMT using the following rule:

Let $e : D \to D:(s',t') \to (s,t)$ be the local affine transform from the new triangle parametrization to the old, resulting in the new maps $f'=f \circ e$ and $h'=h \circ e$. Using the derivative chain rule, the new Jacobian is $J_{h'}(s',t')=J_h(s,t) \cdot J_e(s',t')$ where $J_e$ is the Jacobian of the map e. Therefore, the new metric tensor is:

$$M_{h'}(s', t')=J_{h'}^T J_{h'}=J_e^T J_h^T J_h J_e=J_e^T(s',t')M_h(s,t)J_e(s',t').$$

If e maps triangle vertices from $p_1'$, $p_2'$, $p_3'$ to $p_1$, $p_2$, $p_3$ in D, its Jacobian $J_e$ can be obtained by solving the linear system:

$$(p_1 \ p_2 \ p_3) = (J_e \ o)\begin{pmatrix} p_1' & p_2' & p_3' \\ 1 & 1 & 1 \end{pmatrix}$$

where $o \in D$ completes the affine transform matrix.

For the IMT pre-computation described above, the invention stores $M_h(\Delta_i)$ with respect to a canonical parametrization $f$ of the triangle $\Delta_i$, e.g., one that maps the triangle onto a right-isosceles triangle in D. Then, the affinely transformed IMT is:

$$M_h(\Delta_i)=J_e^T M_h(\Delta_i) J_e$$

since the constant multiplication by matrices $J_e^T$ and $J_e$ is a linear operator that can be factored out of the integration, and the integration over the triangle area in 3D is unaffected by the transform.

To summarize, the invention pre-computes the integrated metric tensors on the original mesh faces with respect to canonical face parametrizations. During optimization, the invention applies the affine transform rule to quickly evaluate the modified signal-stretch metric.

Chart Parametrization Algorithm Utilizing Signal-Stretch Metric

The optimization algorithm of the invention minimizes the nonlinear signal-stretch $E_h(S)$ over the parametrizations (s,t) of the mesh vertices, while maintaining an embedding.

After obtaining some initial chart parametrization, the nonlinear metric is minimized by repeatedly updating individual vertex (s,t) coordinates using line searches in the domain. To prevent parametric folding, each vertex is constrained to remain in the kernel of its neighbors.

With respect to the nonlinear metric $E_h(S)$, IMTs are first computed on each triangle as described above. Perturbing a vertex during optimization induces an affine transform on each of its adjacent faces. The sum of the IMTs on these affinely transformed triangles are then minimized using the formula described in the preceding section.

However, optimizing the chart parametrization using a uni-resolution algorithm has slow convergence, and often converges to bad local minima, particularly for the signal-stretch metric of the invention.

Thus, both the speed and result of optimization are improved with the invention using a novel multiresolution optimization algorithm. In this regard, a hierarchy is established over the chart using a progressive mesh (PM) representation. This PM is constructed by simplifying the chart mesh using a sequence of half-edge collapses, with a quadric error metric that seeks to preserve the surface signal.

Then, as described in more detail below, this multiresolution PM sequence is used (1) to propagate the signal IMT fine-to-coarse from the original mesh to all coarser meshes, and (2) to apply a coarse-to-fine parametrization algorithm that uses these IMTs.

Fine-to-Coarse Metric Propagation

For the hierarchical optimization technique of the invention, the IMTs defined on triangles of the fine mesh are redistributed to the triangles of the coarser meshes in the PM sequence. This redistribution is generally inexact, because the triangles in the meshes at different resolutions lack any nesting property on the surface.

For IMTs to be transferred between faces, they are expressed with respect to a common coordinate system. The invention utilizes the current parametrization for this purpose. The IMTs in the fine mesh triangles are affinely transformed from their canonical frames to their shapes in the current parametrization.

Figure 4:
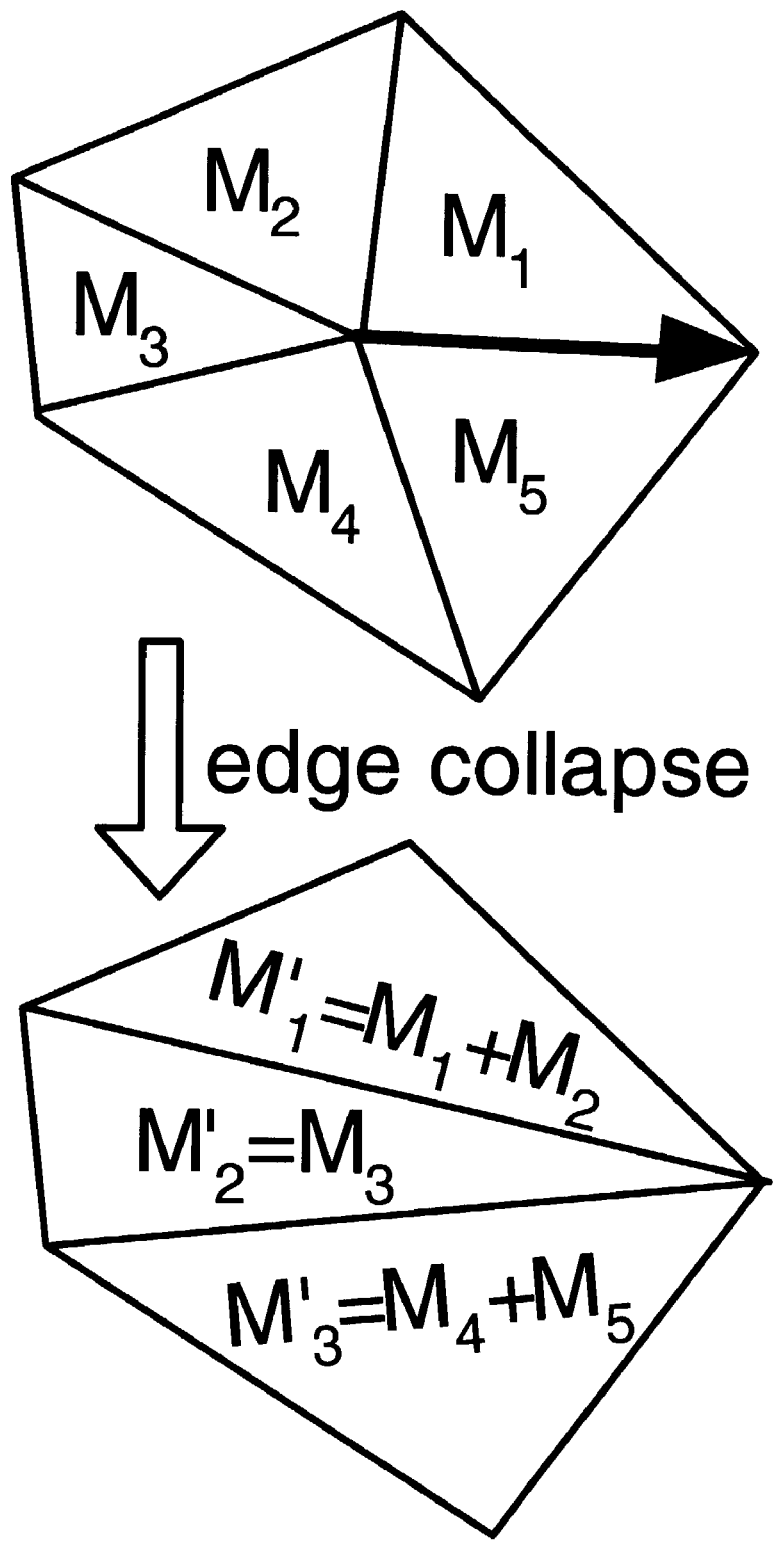
FIG. 4 illustrates an edge collapse algorithm in accordance with the invention.

Then, for each half-edge collapse in the PM sequence, the IMTs are redistributed using the simple scheme illustrated in FIG. 4. This heuristic scheme has the property that the sum of IMTs over mesh triangles is maintained at all levels of detail. Also, the redistribution weights are independent of the current parametrization. In other embodiments, more complex redistribution weights based on parametric overlap areas could be utilized, however, these alternate embodiments generally do not perform as well because the parametrization can initially be poor, i.e., contain highly stretched triangles.

Coarse-to-Fine Parametrization

The coarse-to-fine algorithm of the invention is performed as follows. First, an initial embedding is created for the few faces in the PM base mesh using a brute-force optimization, but also using the IMTs propagated from the fine mesh. Then, for each vertex split refinement operation in the PM sequence, the newly added vertex is placed at the centroid of the kernel of its neighborhood polygon. The placement of the added vertex and its neighbors is then optimized using IMTs. The following exemplary non-limiting pseudocode describes an embodiment of the invention:

```
            // Parametrize the newly added vertex and its neighbors.
procedure optimize_vertex_split(Vertex vnew)
    // obtain initial (s, t) such that the neighborhood is an embedding
    vnew.st := centroid(kernel(Neigbhorhood(vnew)))
    optimize_vertex_parametrization(vnew)
    repeat vertex_niter times
        for (v ∈ Neighbors(vnew))
            optimize_vertex_parametrization(v)
        optimize_vertex_parametrization(vnew)
```

Unlike application of the geometric-stretch metric, the signal-stretch metric can have zero gradient since the signal may be locally constant on a region of the surface. Therefore, as a regularizing term, the invention adds a tiny fraction of geometric-stretch to the minimized energy functional. This prevents the formation of degenerate triangles, and ensures that new vertices find non-degenerate neighborhood kernels.

Iterated Multigrid Strategy

The coarse-to-fine (CTF) optimization creates a new parametrization of the fine mesh. The new parametrization modifies the transformed IMTs on the fine mesh triangles. These transformed IMTs can be propagated fine-to-coarse (FTC), to be used in another iteration of CTF optimization. This process is similar to the V-cycle commonly used in multigrid optimization, but applied here to irregular, non-nested grids.

To bootstrap this iterative optimization process, an initial parametrization is required to transform the IMTs on the finest mesh. We obtain this initial parametrization using a CTF optimization with the geometric-stretch metric. Since IMTs are not yet present, the CTF optimization refers to the geometry of the coarse meshes, i.e., x, y, z at each vertex. The intuition is that a simplified mesh forms a good geometric approximation, and therefore its parametrization is a good starting state for parametrizing a finer mesh.

The high-level algorithm can be summarized with the following exemplary non-limiting pseudocode:

optimized coarse mesh often fails to adequately "reserve" space in the parametric domain for signal detail present in the finer meshes. Thus, the IMTs and their FTC propagation provide this lookahead capability, as shown by the results in Table 1. For Table 1, signal approximation error was measured using 128×128 textures. The first row shows the results of the Floater technique combined with brute force computation. The final row includes the boundary-rectangle optimization described in more detail below, and is shown in FIG. 2B.

TABLE 1

Comparison of Parametrization Methods on the model of FIG. 2B.

| Optimization method | Signal-stretch $E_h(S)$ | Signal error SAE | Timing (secs) |
|---|---|---|---|
| Floater + brute-force | 552.0 | 38.7 | 7265 |
| CTF (vertex signal) | 90.0 | 33.4 | 23 |
| CTF (vertex geometry) | 89.1 | 35.9 | 21 |
| +1 × FTC-CTF IMTs | 34.6 | 18.3 | 43 |
| +2 × FTC-CTF IMTs | 32.9 | 17.7 | 65 |
| +3 × FTC-CTF IMTs | 31.2 | 17.0 | 88 |
| +bound.-rect. FTC-CTF | 28.7 | 15.6 | 118 |

Chart Boundary Optimization

To improve the parametrization quality, chart boundary vertices are allowed to move in the texture domain in accordance with the invention, at all levels of the coarse-to-fine optimization algorithm. For this to work, the invention overcomes the following two problems.

First, the geometric-stretch and signal-stretch metrics are not scale-invariant. These functionals go to zero as the chart becomes infinitely large. Scale-invariance is achieved by the invention by multiplying the functionals by total chart area. This is preferable to multiplying per-triangle stretch by per-triangle area because it is computationally more stable.

Second, it is possible for the optimized chart boundary to self-intersect. To prevent this, when optimizing a chart boundary vertex, the invention tests for intersections between the two adjacent boundary edges and the remaining

```
            procedure optimize_chart_parametrization
Pre-compute canonical IMTs on fine mesh faces.
Construct progressive mesh of chart.
// Initialize the parametrization:
CTF optimize geometric metric without IMTs.
// iteratively optimize using signal-stretch:
repeat ftc_ctf_niter times
    Transform fine mesh IMTs using current parametrization.
    FTC propagate IMTs to all PM meshes.      // Fine-to-Coarse Metric Propagation
    CTF optimize signal-stretch using IMTs.   // Coarse-to-Fine Parametrization
```

For the examples of the Figures herein, ftc_ctf_niter was set equal to 3 iterations. This multigrid strategy is significantly faster than a single-resolution optimization, as shown in Table 1 below.

It is noted that one may use CTF optimization directly on the per-vertex signal instead of on the IMTs. However, a problem with such a technique is that the surface signal varies too much. Unlike the geometric signal, the surface signal is not well approximated on a coarser mesh. As an example, a color-map signal usually zigzags across the unit RGB cube many times as one traverses the surface. Thus, an boundary edges. Since there are typically $\sqrt{m}$ boundary elements for a chart of m vertices, this brute-force testing is not unduly cumbersome.

One limitation of allowing the chart boundary to take on an arbitrary shape in D is that it imposes constraints on subsequent mesh simplification. More vertices need to be retained on the simplified mesh to represent the boundaries, because their irregular parametric shapes are difficult to approximate with coarse polygons. The approach of the invention is thus to simplify the mesh prior to parametrizing it.

Growth to Bounding Rectangle

For a single chart, the invention embeds its parametrization into a square texture image. For multi-chart meshes, the invention finds the tightest bounding rectangle around each chart, and packs these rectangles within the texture. In either case, some texture regions within the bounding square or rectangle are left unused. To reduce these wasted regions, the invention encourages the chart to grow into the unused space, which is achieved using an additional FTC-CTF iteration where the chart area penalty is removed, but the chart boundary is constrained to remain within the original bounding rectangle.

Relative Chart Scaling

When optimizing multi-chart meshes, a separate, isotropic scale is applied to each chart to minimize error over the entire mesh. Given N charts with domain areas $a_i$ and error metrics $E_i$, an area scale factor $\alpha_i$, e.g., a 1D scale by $\sqrt{\alpha_i}$ in both s and t, is determined for each chart. Isotropically scaling a chart by $\alpha_i$ creates the new error $E_i'=E_i/\alpha_i$; for example, a chart 4 times bigger has ¼ the squared signal-stretch. Thus, the invention seeks to find:

$$\operatorname{argmin}_{\alpha_i \ldots \alpha_N} \left( \sum_{i=1}^{N} E_i / \alpha_i \right) \text{such that} \sum_{i=1}^{N} \alpha_i a_i = 1$$

which minimizes summed error after the scaling, subject to the constraint that the total resealed domain area is held constant.

The optimal chart area scalings can be derived in closed form using the method of Lagrange multipliers as the following:

$$\alpha_i = \sqrt{E_i/a_i} \bigg/ \sum_{k=1}^{N} \sqrt{E_k a_k}.$$

EXAMPLES

Thus, the present invention provides various technique(s) for implementing a signal-specialized metric for use with parametrization. In this regard, through a comparison to other parametrization schemes, FIGS. 5A to 10B illustrate the effects of applying the signal specialized metric of the invention on a number of models, which are summarized in Table 2 below. Each of the models of FIGS. 5A to 10B originated from 3D scanning. The signals on the parasaur and horse were created by projecting hand-painted images onto the surfaces. The signals on the gargoyle and cat are normal maps. The signal on the face is scanned color data.

TABLE 2

Model sizes and parametrization timings.

Figure 5A:
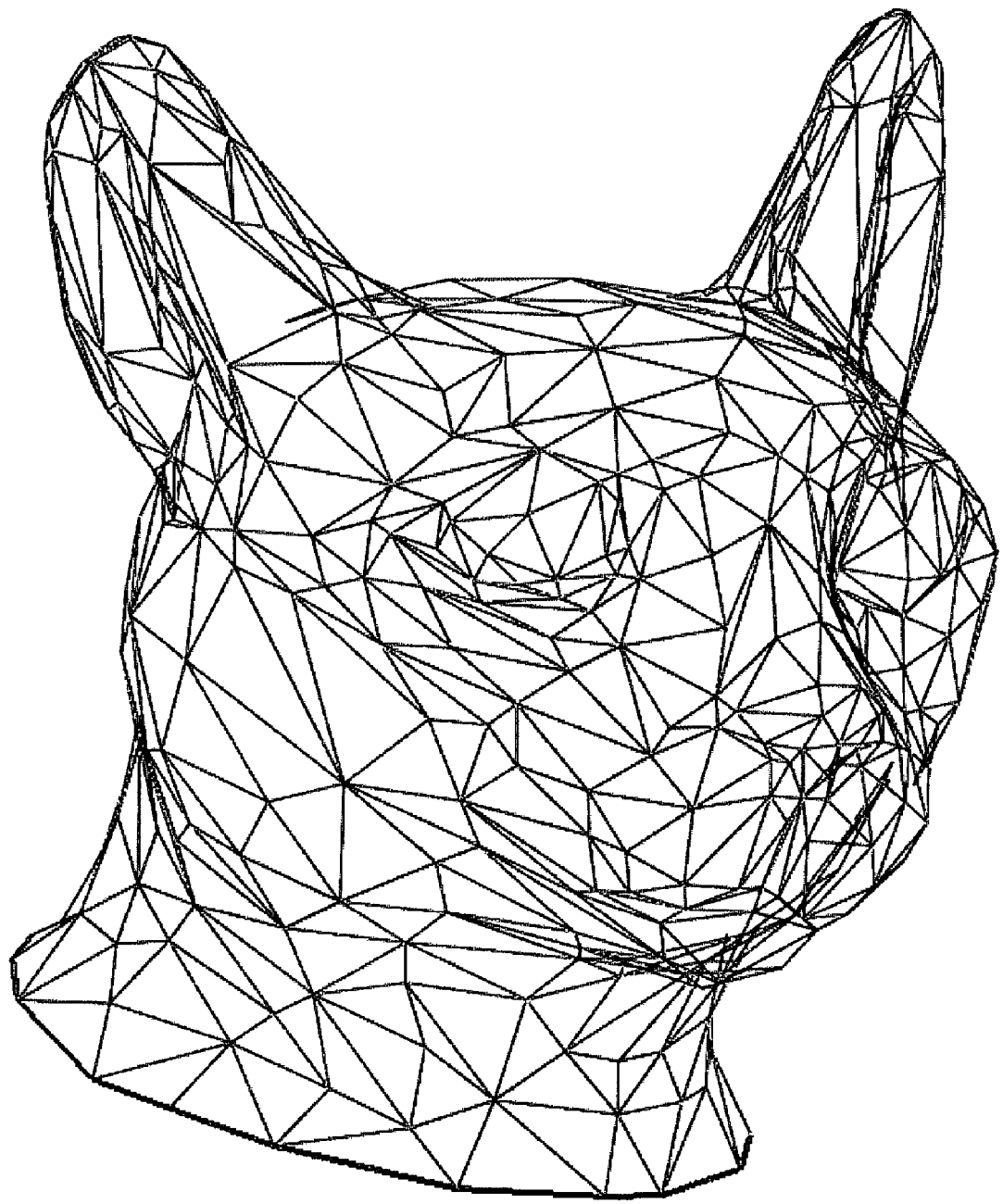
FIGS. 5A to 5P illustrate a comparison of the Floater technique, geometric-stretch technique and the signal-stretch technique of the invention.
Figure 5B:
Figure 5C:
Figure 5D:
Figure 8A:
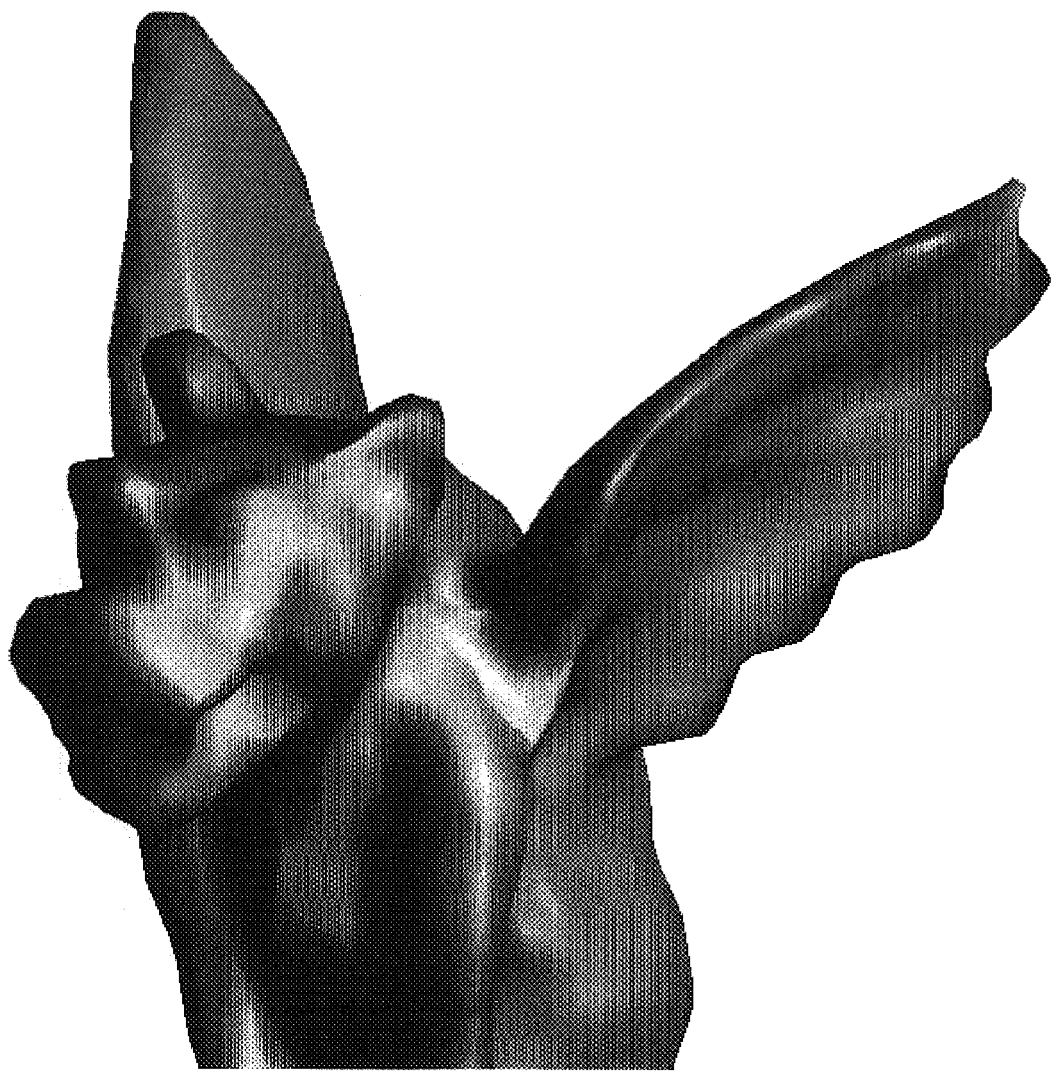
FIGS. 8A to 10B compare the application of the geometric-stretch metric to the application of the signal-stretch metric of the invention for the same texel size, thereby resulting in significant signal approximation error reduction.
Figure 8B:
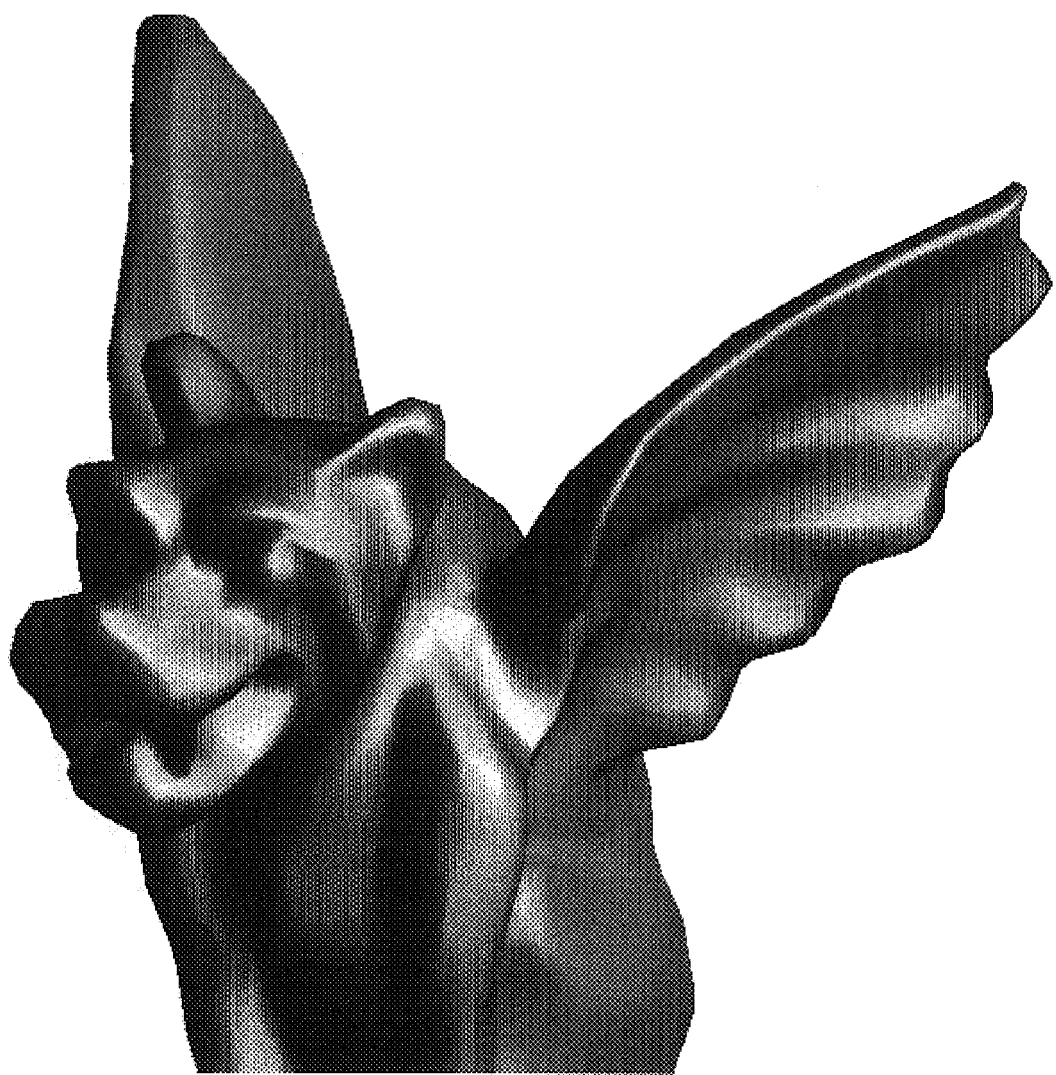
Figure 9A:
Figure 9B:
Figure 10A:
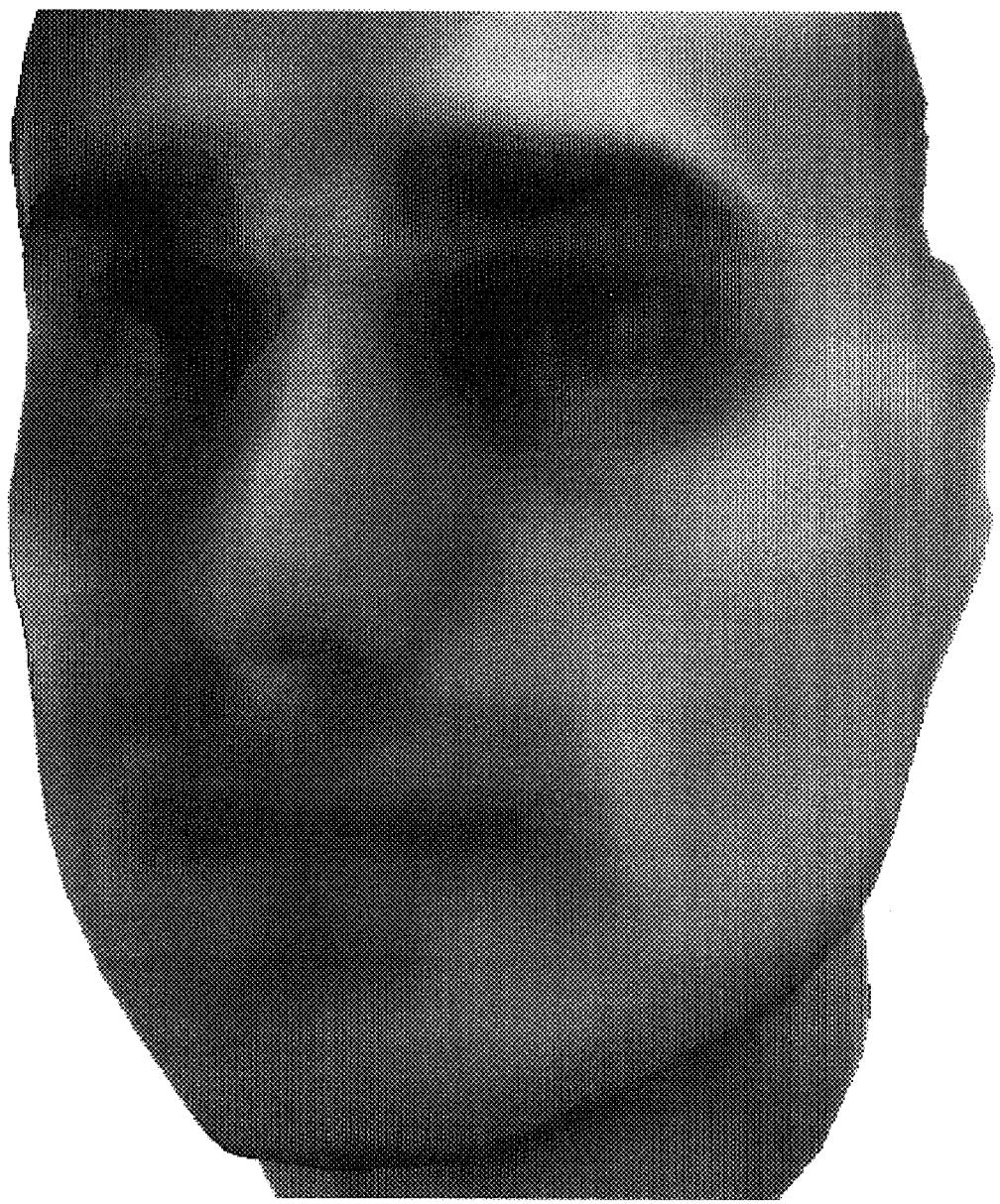
FIGS. 10C and 10D illustrate texture-domain representations of the surfaces of FIGS. 10A and 10B.
Figure 10B:
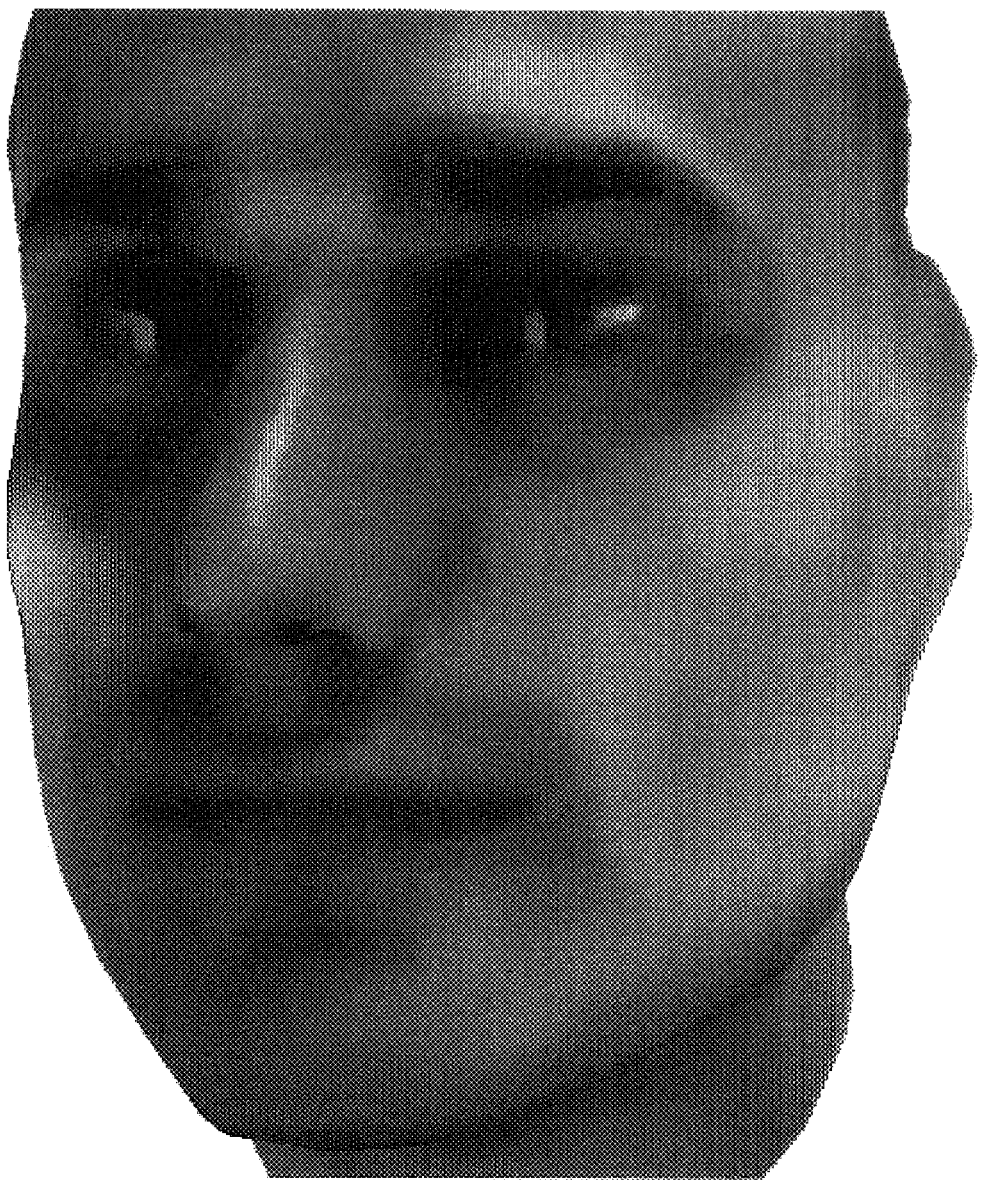

| | | #Vertices | | | Timing |
|---|---|---|---|---|---|
| | Model | Original | Param. | #Charts | (secs) |
| FIG. 2B | parasaur | 3,870 | 3,870 | 1 | 118 |
| FIG. 8B | gargoyle | 50,000 | 2,500 | 6 | 68 |
| FIG. 9B | horse | 5,000 | 5,000 | 5 | 147 |
| FIG. 10B | Face | 68,075 | 1,315 | 1 | 45 |
| FIG. 5D_5O | cat | 53,197 | 1,000 | 1 | 10 |
| | cat | 53,197 | 53,197 | 1 | 1267 |

For most examples herein, the mesh was pre-simplified with a geometric quadric error metric. The signal on this coarse mesh was transferred from the fine mesh by ray-shooting along the interpolated surface normal. For the gargoyle and horse models, the mesh was manually partitioned into 6 and 5 charts, respectively.

Figure 5E:
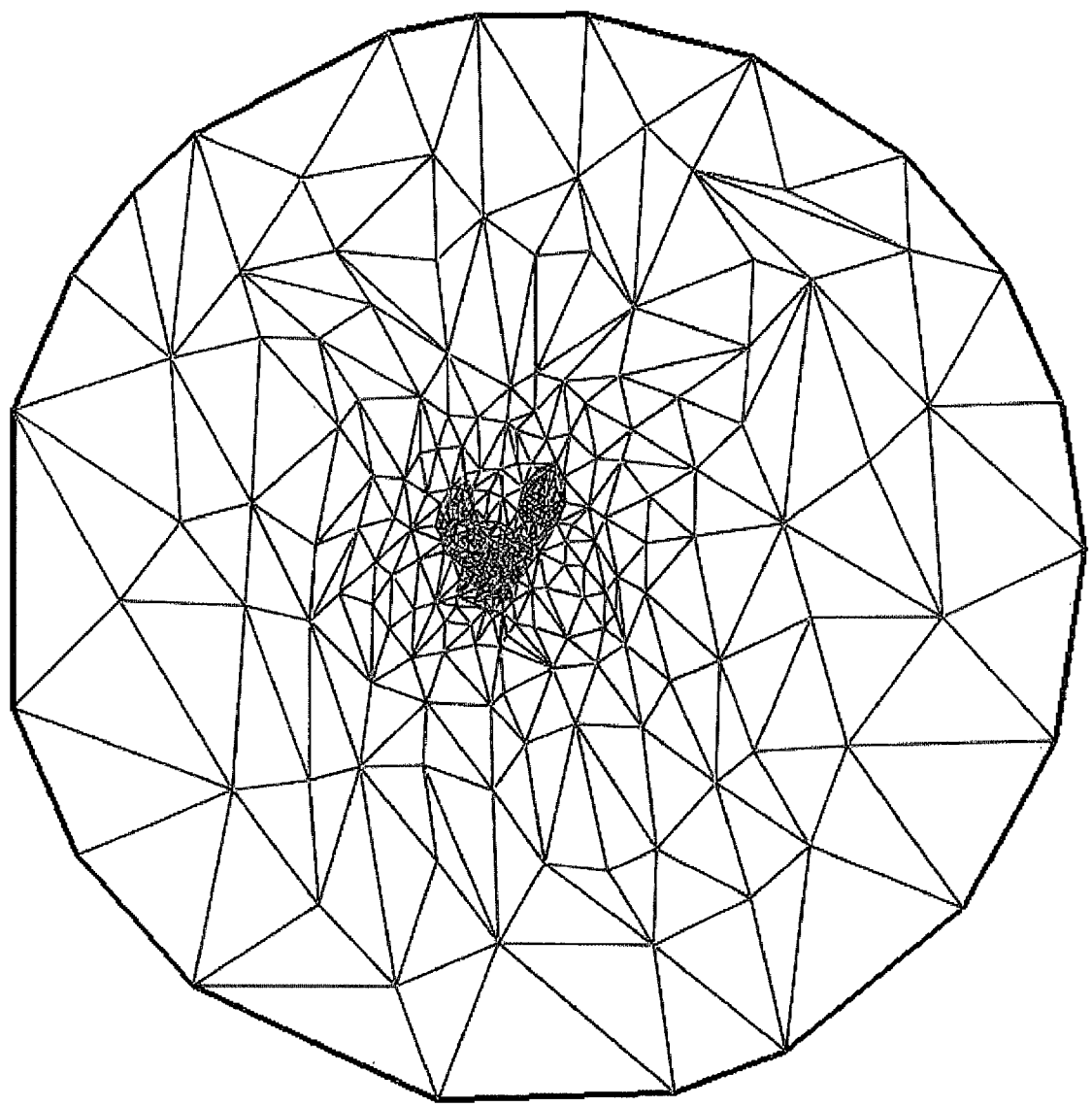
Figure 5F:
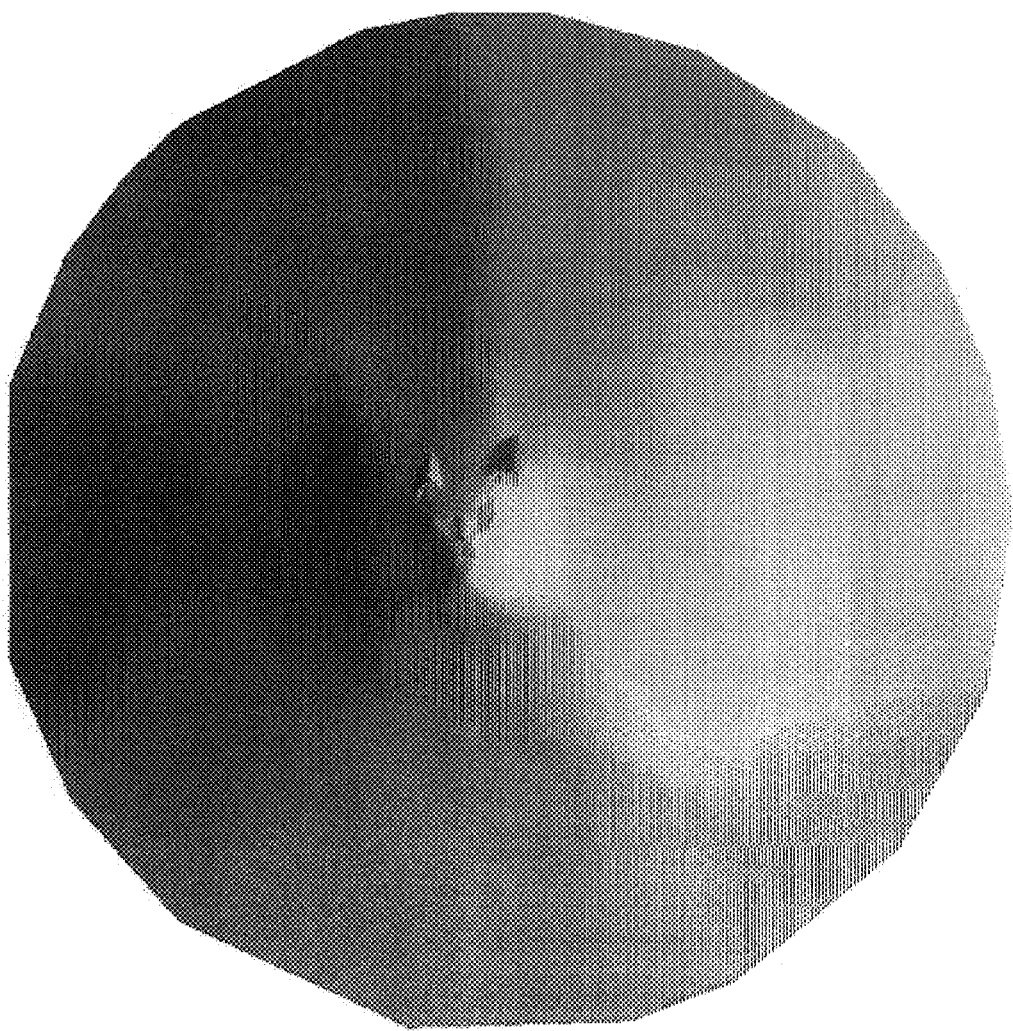
Figure 5G:
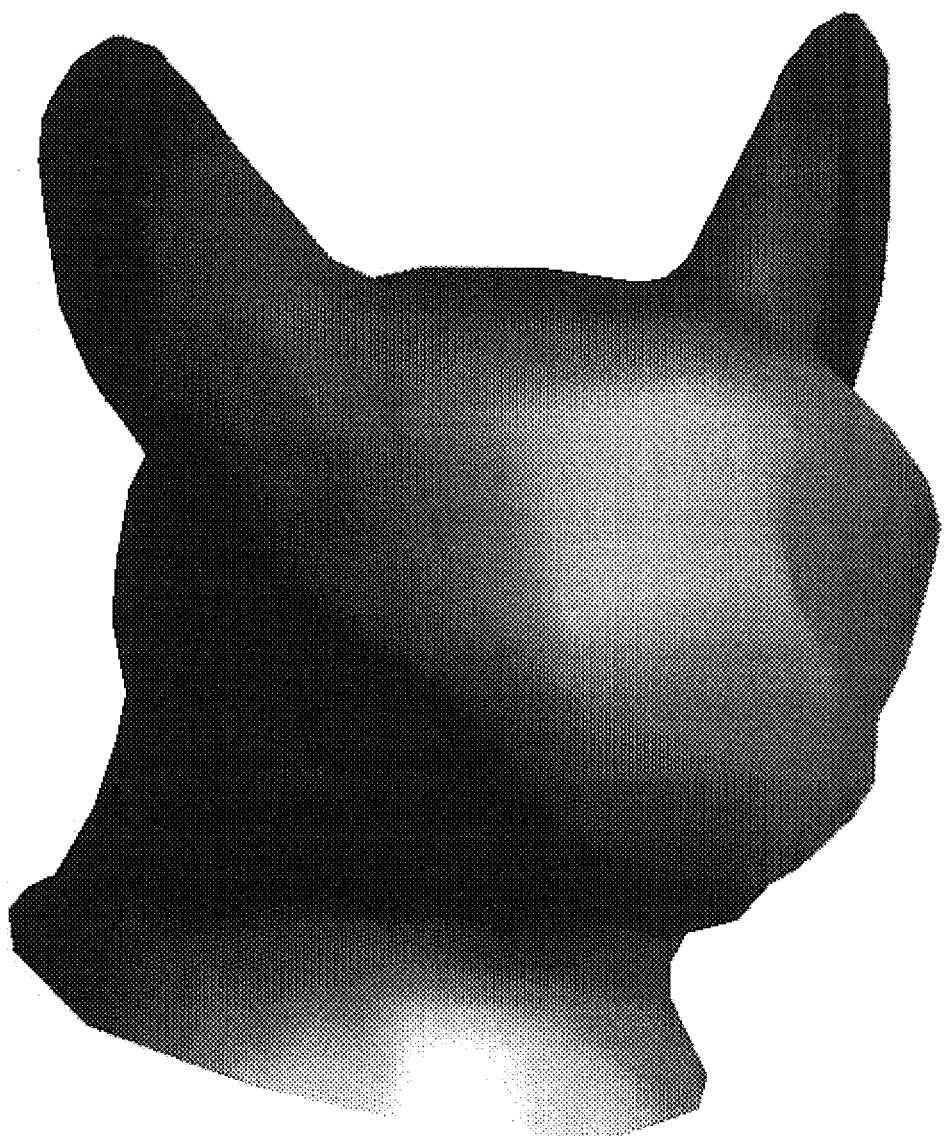
Figure 5H:
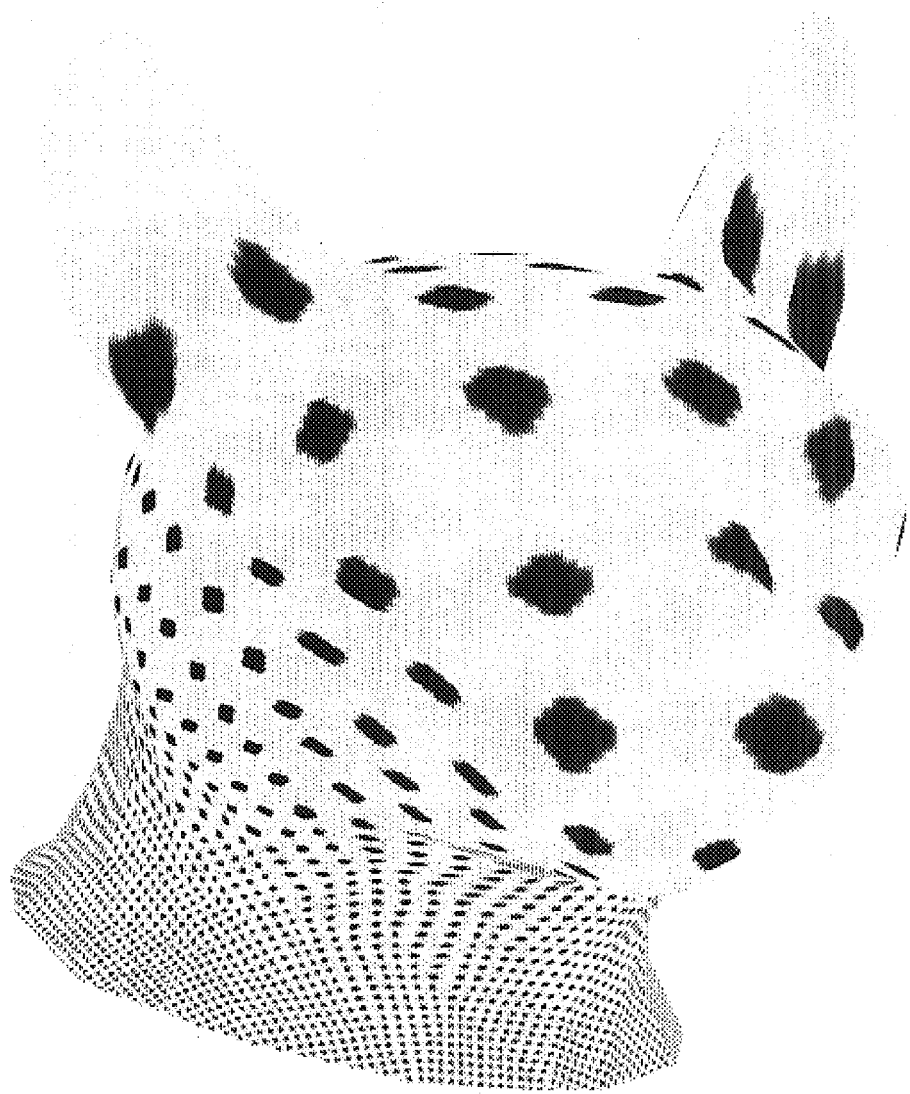
Figure 5I:
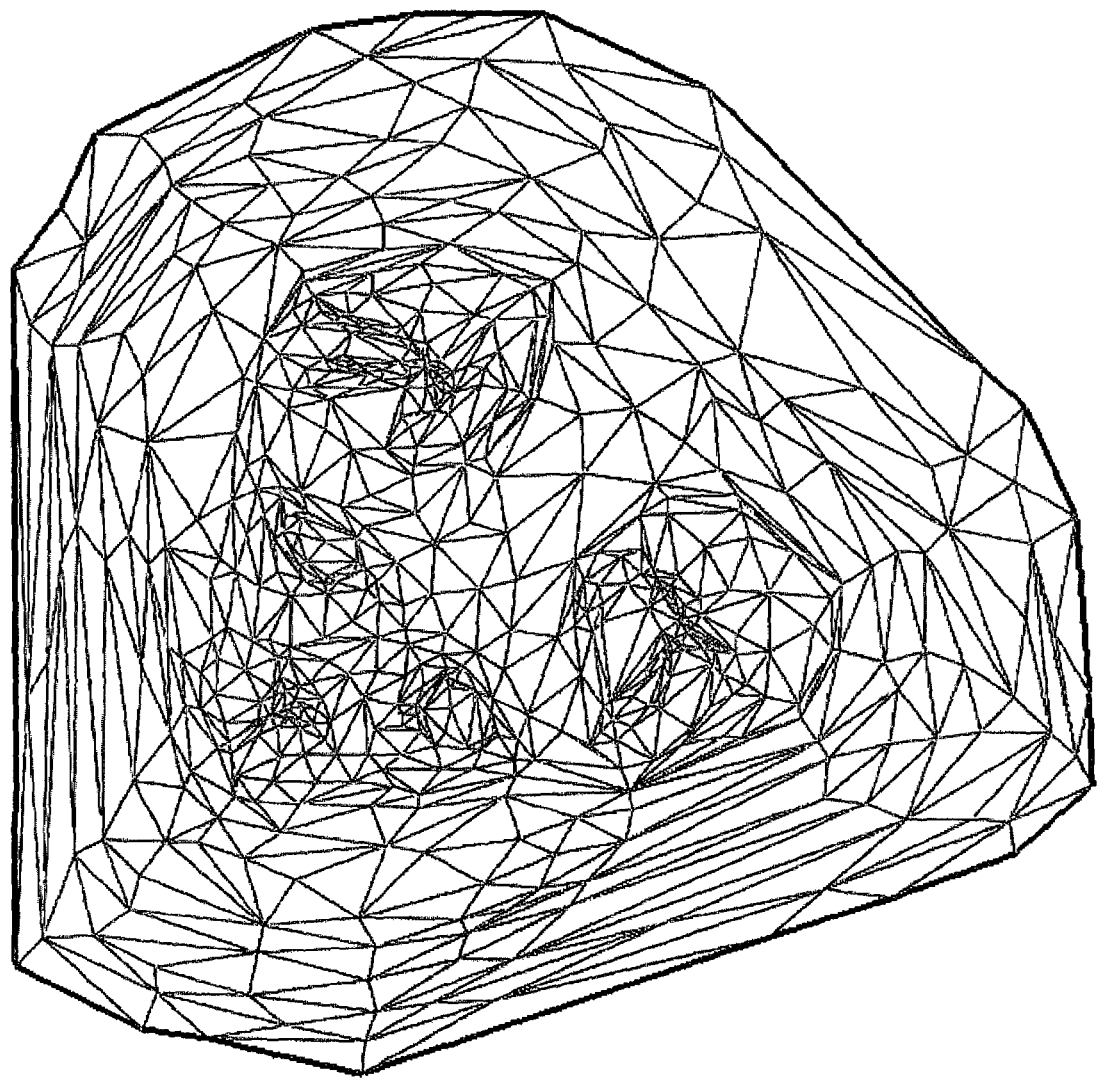
Figure 5J:
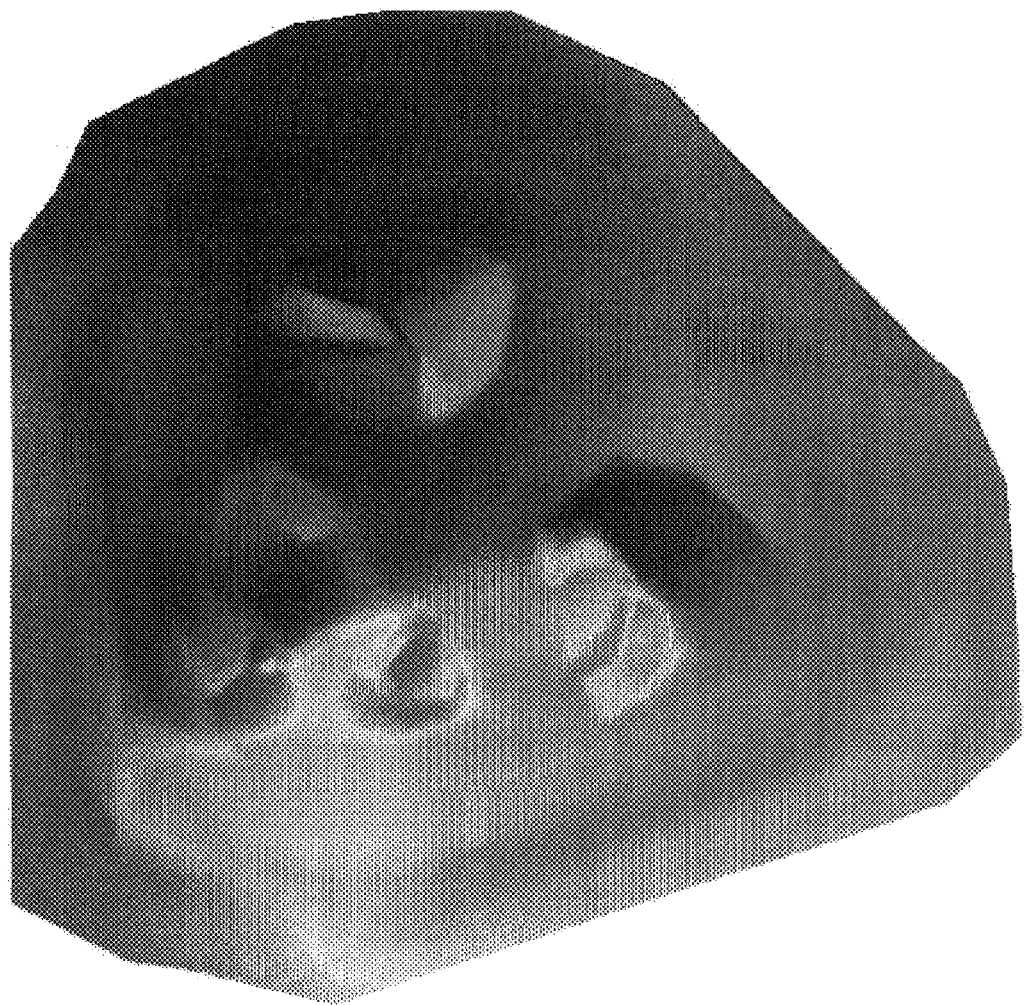
Figure 5K:
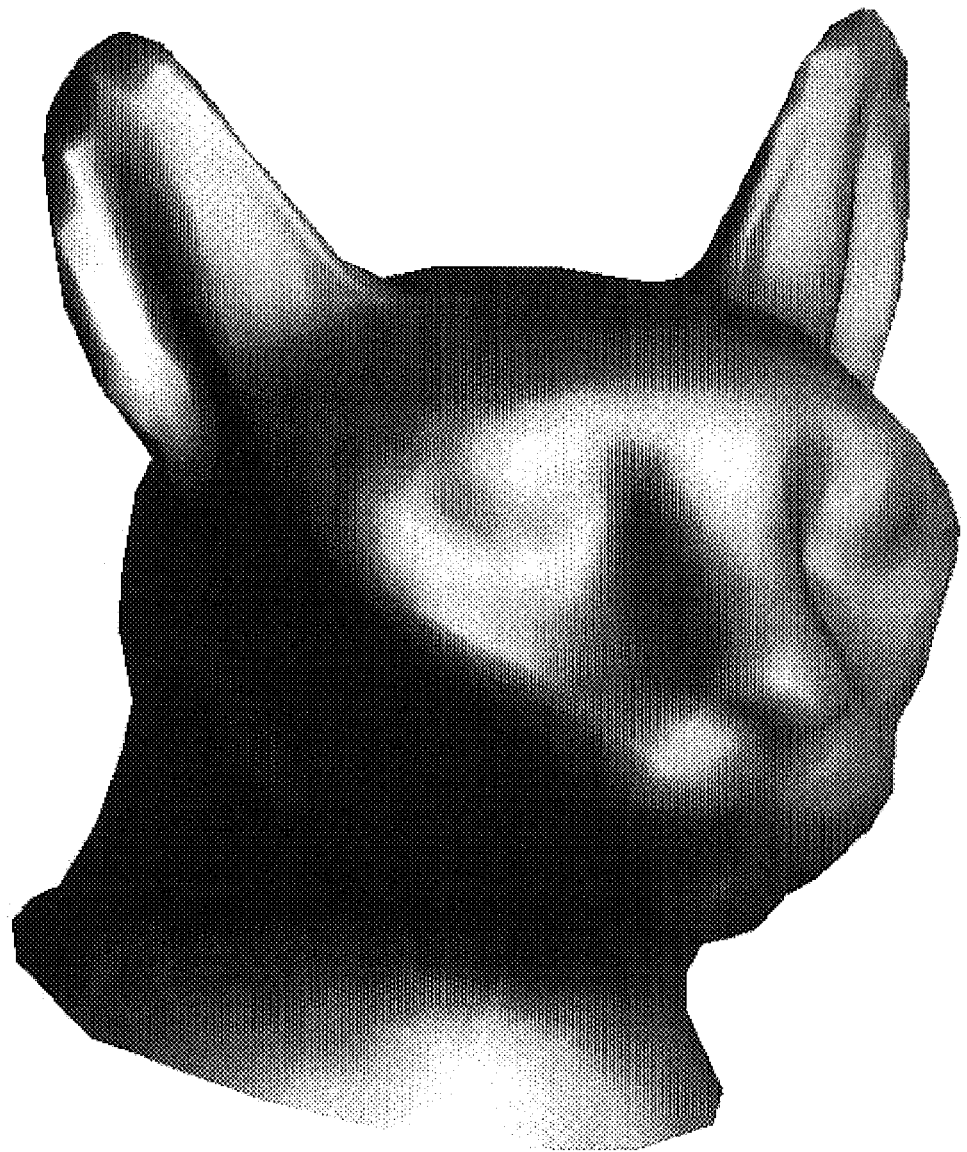
Figure 5L:
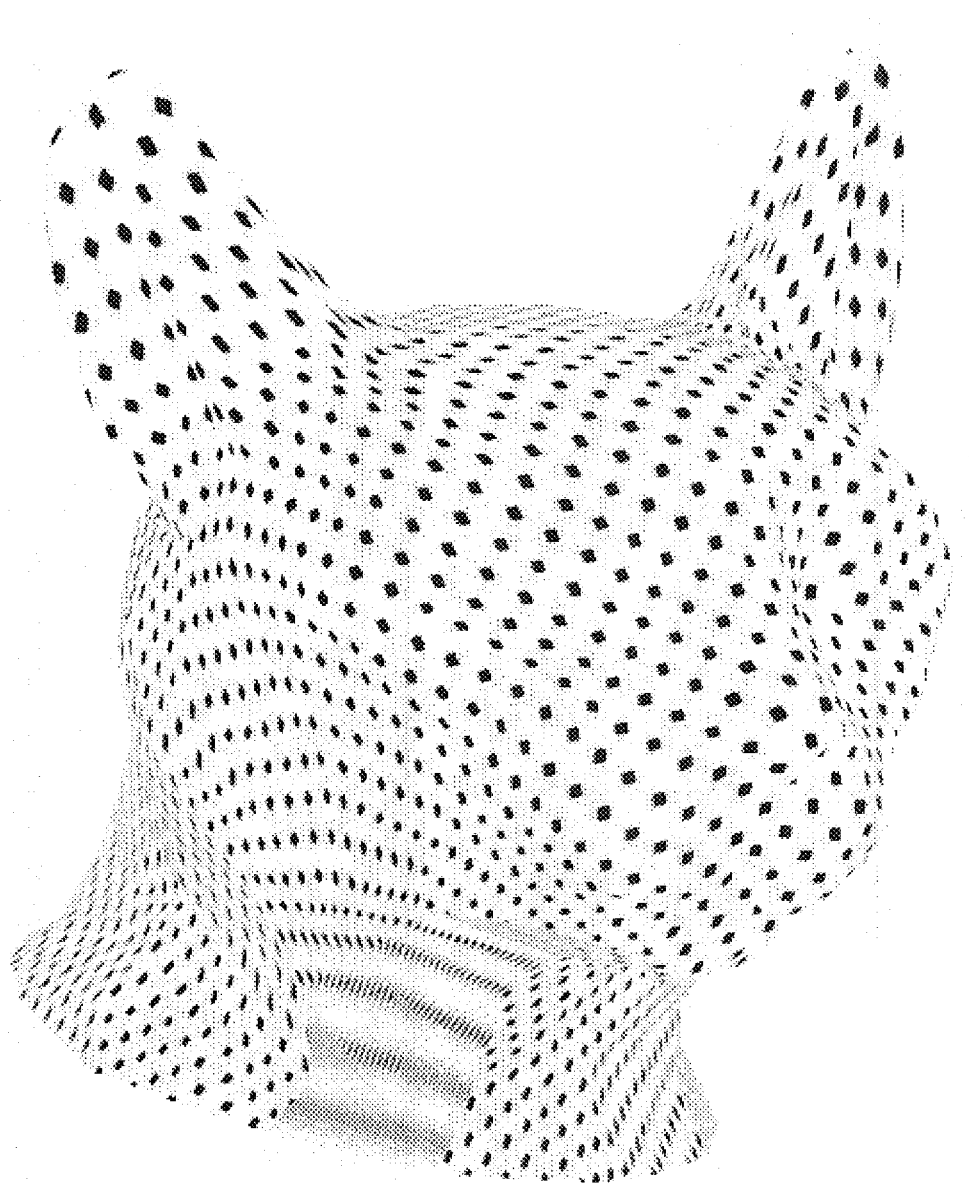
Figure 5M:
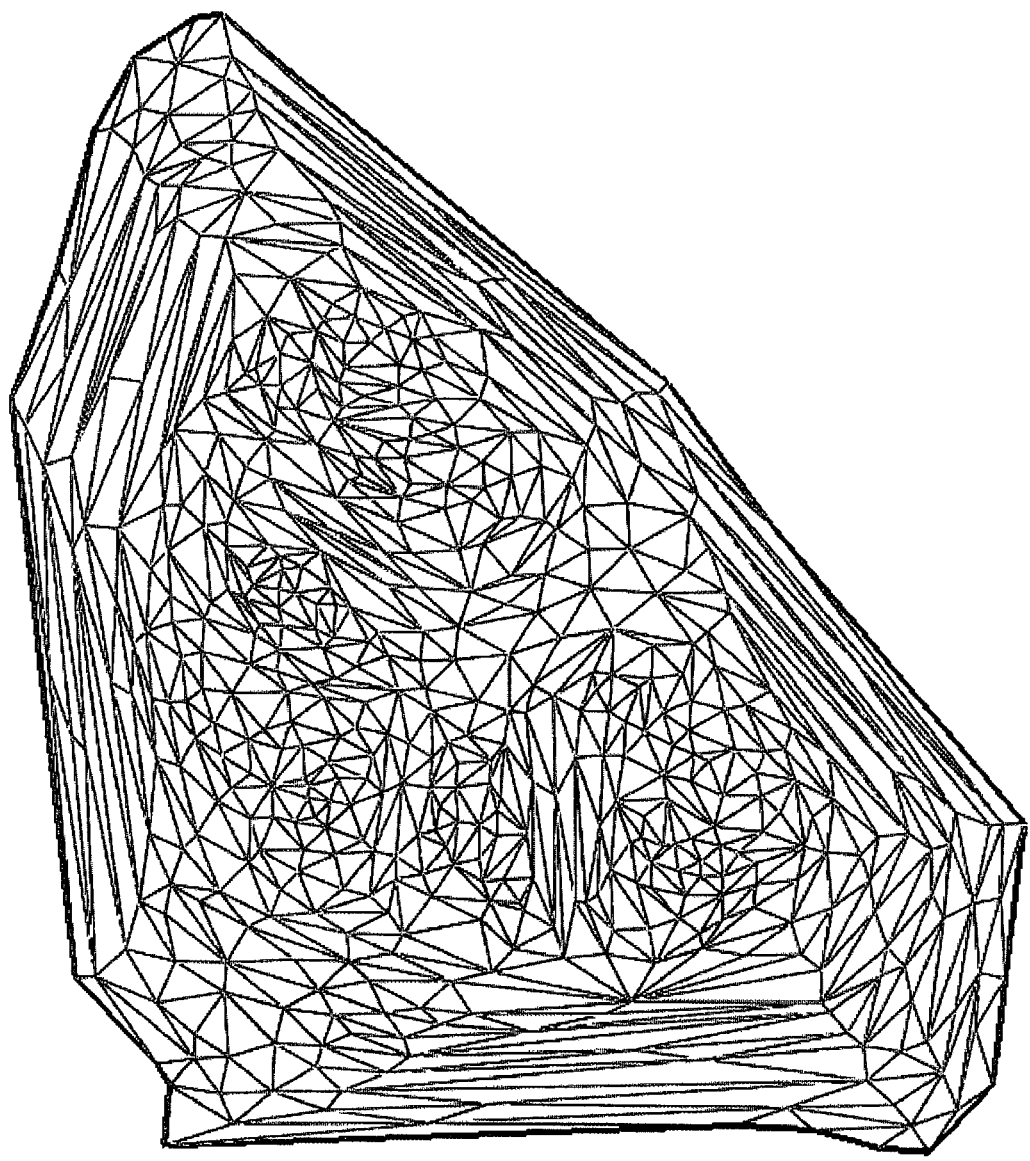
Figure 5N:
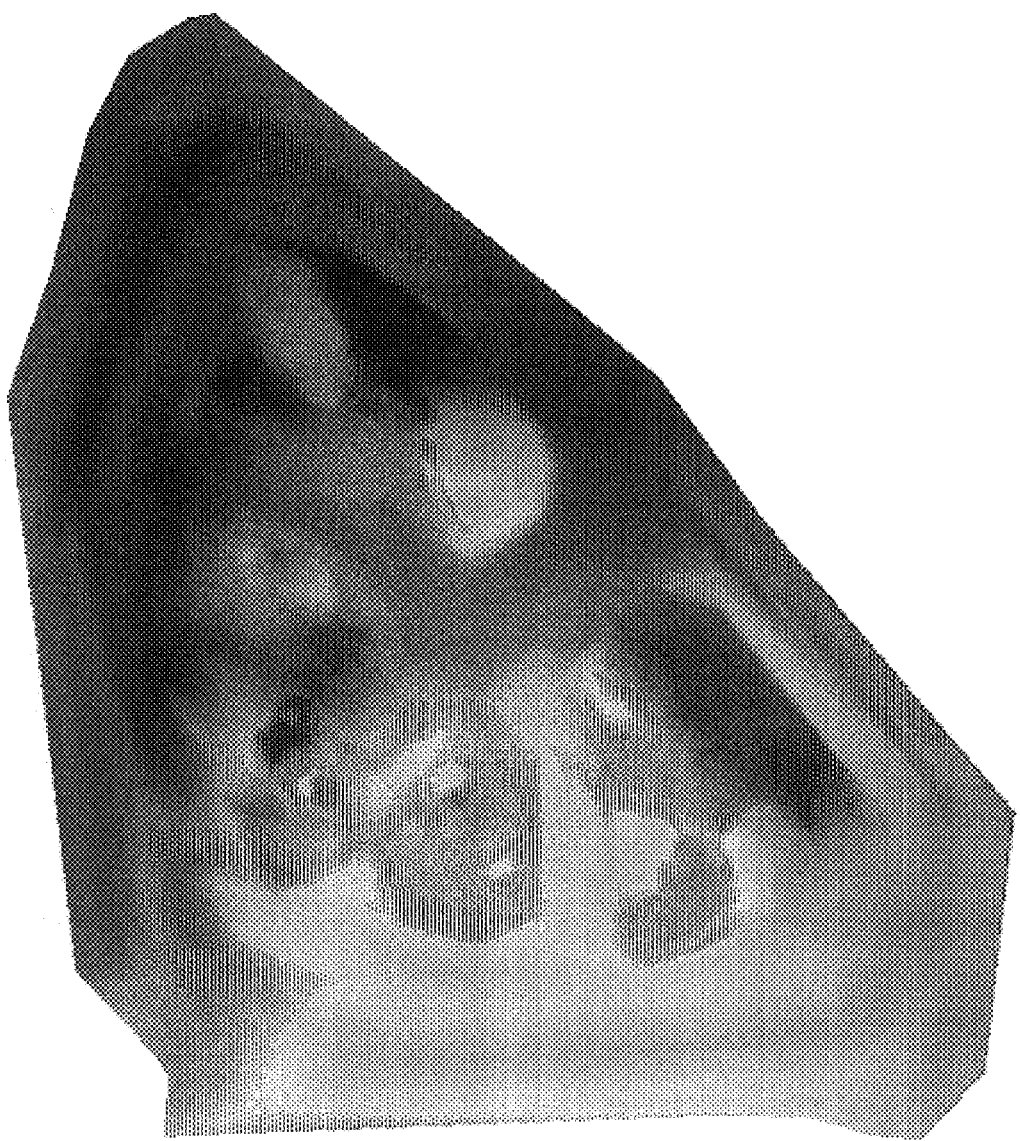
Figure 5O:
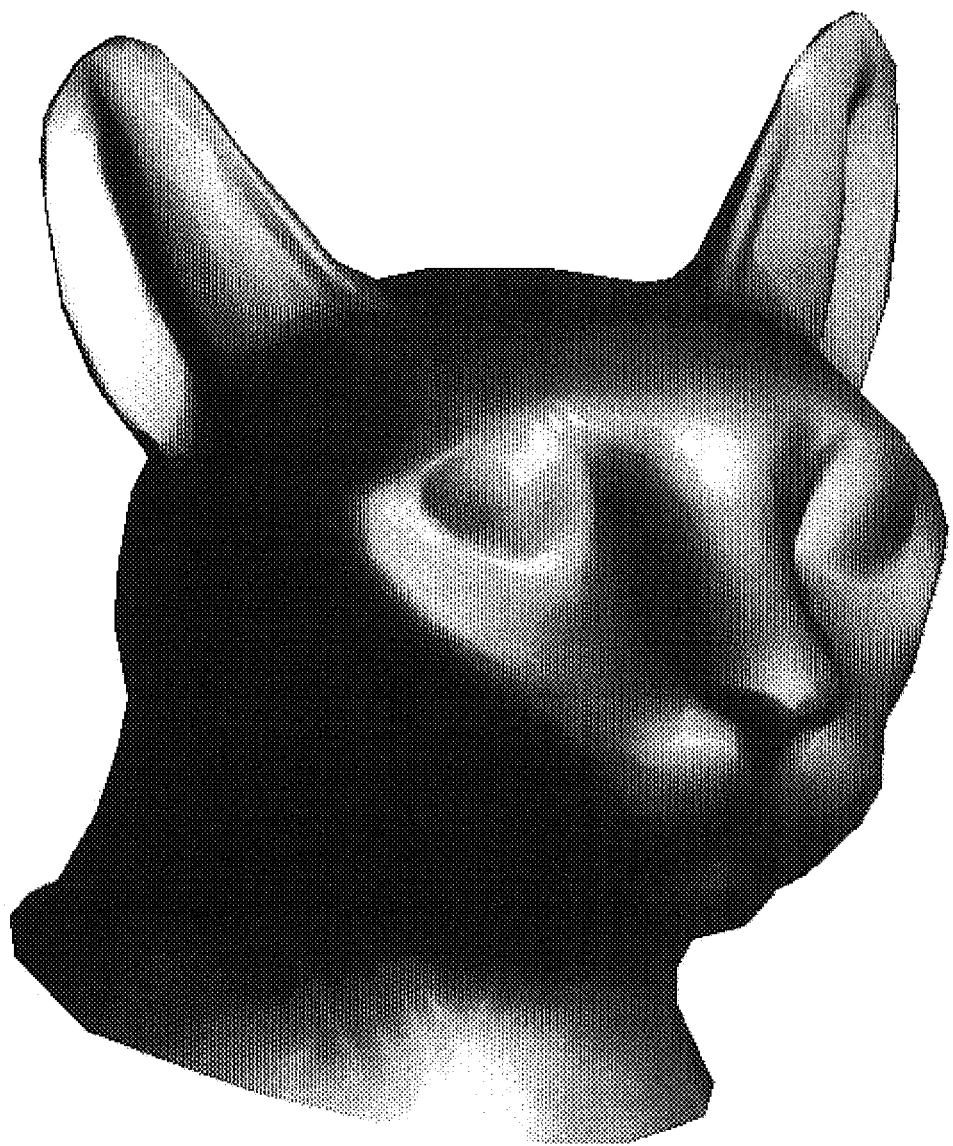
Figure 5P:
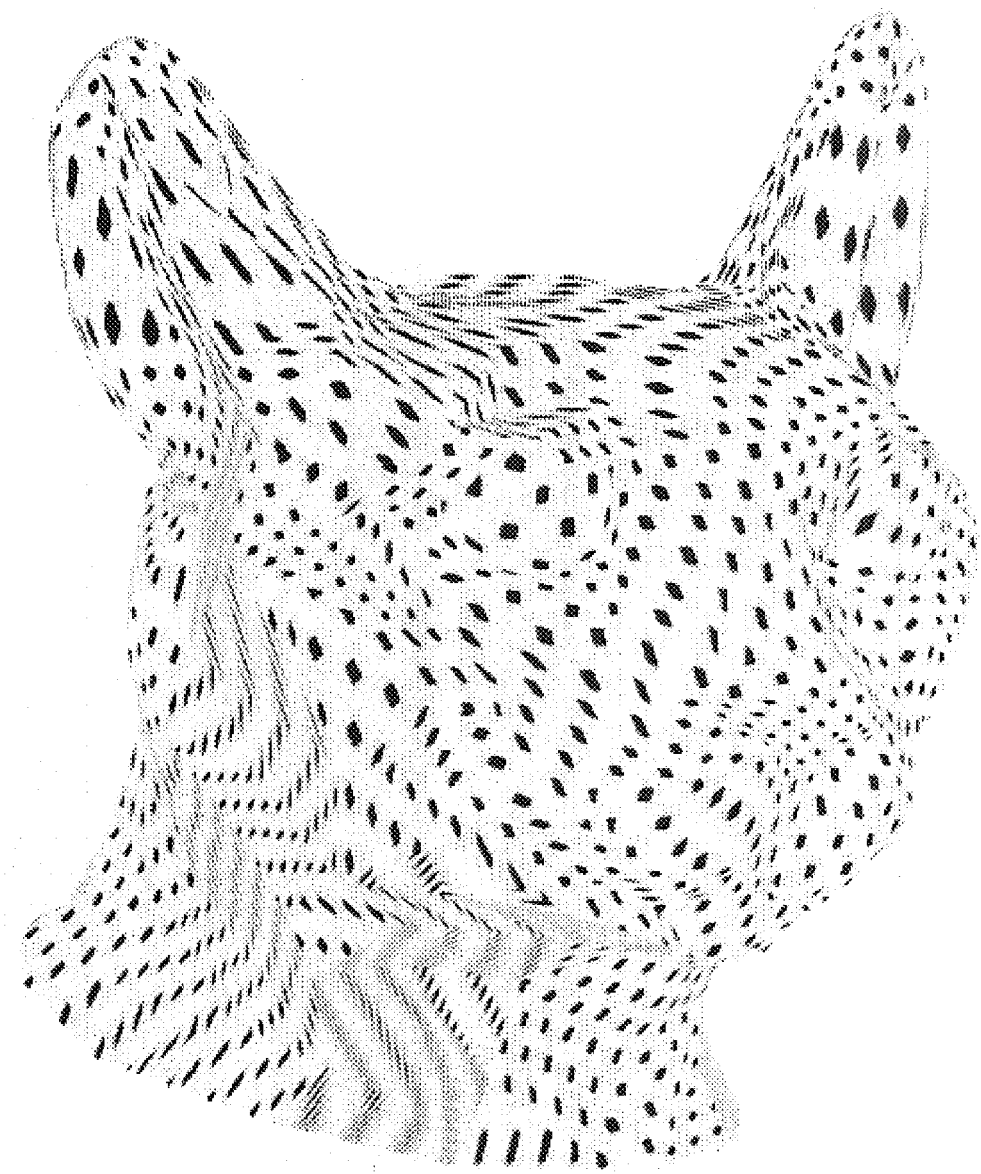

FIGS. 5A to 5P illustrate the results of a qualitative comparison of three different parametrizations of the cat surface. FIG. 5D is the original scanned mesh of 53,197 verts and is used to generate the surface mesh chart (1,000 verts), the normal-field signal ($RGB=n_x,n_y,n_z$) and shaded surface of FIGS. 5A to 5C, respectively. The input of FIGS. 5A to 5C utilized for the parametrizations of FIGS. 5E to 5P thus consists of a surface mesh and an associated surface signal. For these examples, the mesh is simplified from the high-resolution model of FIG. 5D and its signal is defined using normal-shooting correspondence.

FIGS. 5E to 5P enable a comparison of parametrization schemes for a single chart, where the surface signal is a normal map. FIGS. 5E, 5I and 5M show the parametrization of the chart in the texture domain, FIGS. 5F, 5J and 5N show the normal-map signal transferred to the texture domain, FIGS. 5G, 5K and 5O show the shaded surface using normal-map reconstructed from the texture with 64×64 samples, and FIGS. 5H, 5L and 5P show the visualization of mapping a regular 64×64 texture grid pattern onto the surface.

Signal approximation error (SAE) is the root mean squared (rms) $L_2$ difference between the original color signal and its reconstruction over the surface. For this 8-bit/channel normal-map, SAE ranges from 0 to $255\sqrt{3}$. To quantify parametrization quality, the SAE is measured as the rms difference on a dense set of surface points, distributed uniformly according to surface area. For each point, the difference between the original surface signal and the bilinear interpolation of the four adjacent texture samples is computed. For vector-valued signals, the $L_2$ norm is used.

FIGS. 5E to 5H illustrate the result utilizing the Floater technique, which is representative of a parametrization that ignores absolute surface stretch, e.g., as also with harmonic map, conformal map and MIPS. The SAE for the Floater parametrization is 51.4. The geometric-stretch parametrization illustrated by FIGS. 5I to 5L provides the most even distribution of texture samples over the surface, as is most evident from FIG. 5L. The SAE for the geometric-stretch parametrization is 16.1. The signal-stretch parametrization of the present invention is illustrated in FIGS. 5M to 5P, which adapts the sampling density to local signal detail. Taking a close look at FIGS. 5O and 5P, it is noted how the sharp signal transitions near creases are allotted more space in the texture domain. Thus, the reconstructed signal is significantly better. For FIGS. 5I to 5P, the chart boundary growth algorithm described herein was omitted in order to make a fair comparison with the Floater technique, and to show the natural shapes that the charts adopt using the algorithm of the invention. Considering the fact that 43% of the 64×64 texture samples are thus unutilized, the reconstruction quality of the invention is all the more demonstrated by the example. The SAE for the signal-stretch parametrization is 10.7.

Figure 6A:
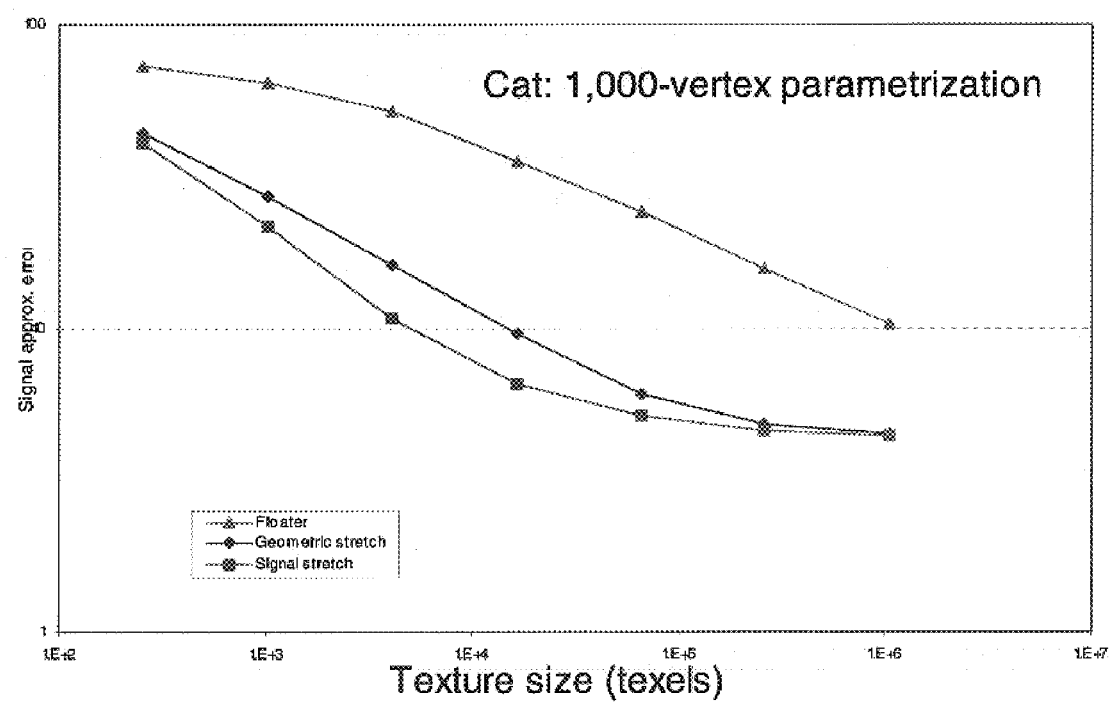
FIGS. 6A and 6B are graphs which relate signal approximation error to texture size for a 1000 vertex parametrization and 53,197 vertex parametrization, respectively.
Figure 6B:
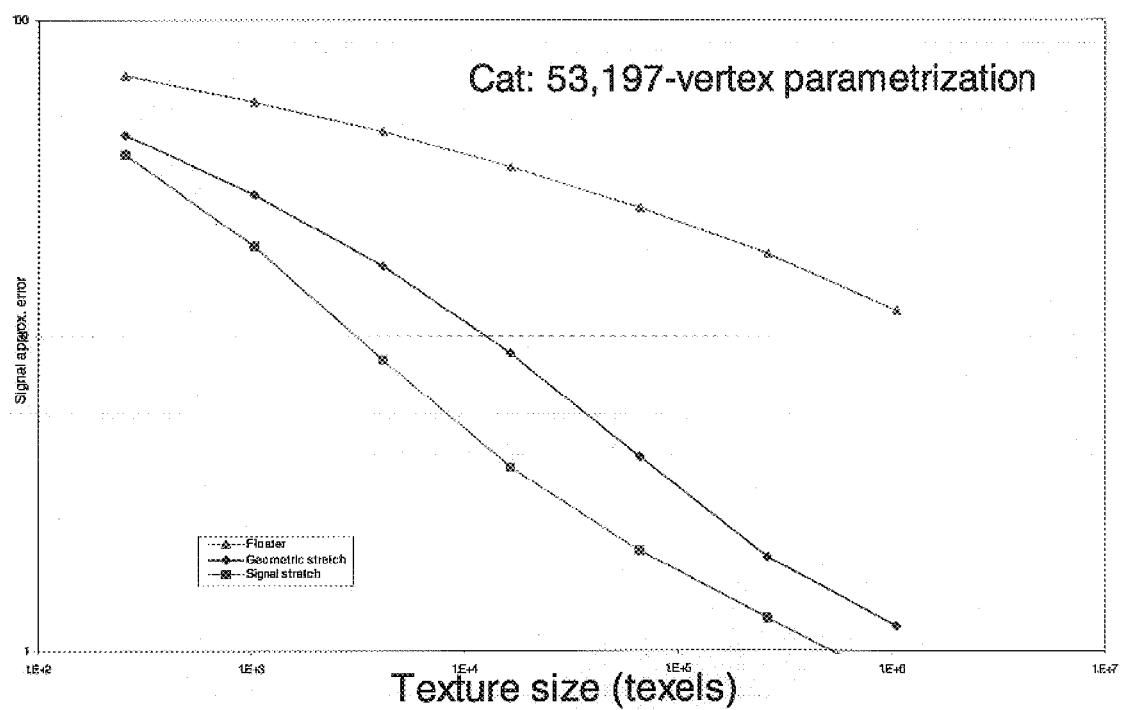

FIGS. 6A and 6B graph the SAE as a function of texture size for three parametrizations, using a 1000-vertex mesh (FIG. 6A), and using a 53,197-vertex mesh (FIG. 6B). The circled points of FIG. 6A indicate the 64×64 textures rendered in FIGS. 5F, 5J and 5N. The graphs show a notable reduction in error from the geometric-stretch to the signal-specialized metric. In particular, a given approximation error can be obtained with a factor ~3–5 savings in texture size utilizing the invention. In FIG. 6A, the signal-stretch deteriorates at higher texture sizes because the curves uses the same coarse 1,000-vertex parametrization for all texture resolutions. For high-resolution textures, it is beneficial to increase the parametrization complexity. By comparison, the graph of FIG. 6B shows the result of using the original 53,197-vertex mesh to parametrize the signal. The improvement gained by the invention is then more uniform along the whole range of texture resolutions.

Figure 7A:
FIGS. 7A and 7B compare the application of the geometric-stretch metric to the application of the signal-stretch metric of the invention for the same signal approximation error, thus resulting in significant texture element (texel) savings.
Figure 7B:

FIGS. 7A, 7B, 8A, 8B, 9A, 9B, 10A and 10B show further examples of the operation of the signal-stretch metric of the invention compared to a geometric-stretch metric that does not take the surface signal into account. FIGS. 7A and 7B illustrate that for the same SAE, much fewer texture samples are required when using the invention. FIGS. 7A to 10B illustrate that for the same number texture samples, the invention significantly lowers the SAE. FIGS. 7A, 8A, 9A and 10A illustrate the use of the geometric-stretch parametrization and FIGS. 7B, 8B, 9B and 10B illustrate the use of the signal-stretch parametrization of the invention.

FIG. 7A is rendered with a 256×256 texture and has an associated SAE of 6.3. FIG. 7B is the signal-stretch parametrization version, rendered with a 128×128 texture, and having an associated SAE of 6.3. Thus, FIGS. 7A and 7B illustrate that the invention enables the texture size to be reduced by a factor of 4 for the same signal approximation error.

FIG. 8A is rendered with a 128×128 texture and has an associated SAE of 17.9. FIG. 8B is the signal-stretch parametrization version, also rendered with a 128×128 texture, but has an associated SAE of 9.6, much lower than the geometric-stretch version.

FIG. 9A is rendered with a 128×128 texture and has an associated SAE of 65.0. FIG. 9B is the signal-stretch parametrization version, also rendered with a 128×128 texture, but has an associated SAE of 31.0, much lower than the geometric-stretch version.

Figure 10C:
Figure 10D:

FIG. 10A is rendered with a 64×64 texture and has an associated SAE of 10.4. FIG. 10B is the signal-stretch parametrization version, also rendered with a 64×64 texture, but has an associated SAE of 8.1, again lower than the geometric-stretch version. FIGS. 10C and 10D are texture domain representations for the surfaces of FIGS. 10A and 10B, respectively. Relative to the geometric parametrization version, in FIG. 10D, one can see the increased detail afforded to the pupils of the eyes and the nostrils of the nose by the signal-specialized parametrization of the invention, to account for the high variation of signal content in these regions of the corresponding surface portion.

Figure 11:
FIG. 11 shows the warping of the texture signal as a result of the application of the signal-stretch parametrization of the invention.

As illustrated by FIG. 11, the texture domain for the signal-stretch parametrization of the invention shows the warping of the texture signal. The example of FIG. 11 also demonstrates the result of the bounding-rectangle growth described above. This growth optimization reduces the SAE by 13% for this example and thus represents significant efficiency savings.

CONCLUSION

Herein a signal-stretch parametrization metric is provided that was derived from a Taylor expansion of signal approximation error and applied to improve parametrization processes. The metric is more challenging to optimize than traditional geometric metrics because surface signals often vary greatly. Consequently, a multiresolution algorithm was introduced that accumulates the fine signal variation onto the faces of coarser meshes, to provide "lookahead" during coarse-to-fine optimization. Such a lookahead technique, however, could be applied to any parametrization process because a look at fine detail helps to parametrize at the coarse level of detail such that there is a smooth, efficient transition from a coarse level of detail to a fine level of detail, and vice versa. Moreover, by integrating a metric tensor, the invention encapsulates signal directionality. The signal-stretch parametrization optimization algorithm of the invention also accelerates the minimization of other parametrization metrics, both linear and nonlinear, such as the geometric-stretch metric. In sum, the signal-specialized parametrization of the invention allocates more texture samples to mesh regions with greater signal variation. Texture resolution can be selected based on the desired signal reconstruction accuracy. Often, reduction in texture space by a factor of four is possible with the invention.

The signal-stretch metric is most effective on surfaces with inhomogeneous signals, i.e., non-uniform distribution of detail. For homogenous signals, the metric reduces to the geometric-stretch metric if the signal map g is an isometry. Interestingly, g cannot be an isometry if the signal is scalar, since $J_g^T J_g$ cannot be the identity matrix for a 1×2 Jacobian $J_g$. In other words, a scalar signal always has a direction of zero derivative, and can therefore be locally squashed parametrically. At the same time, the gradient direction may vary, and the global constraint that the parametrization remain continuous restricts how much squashing can occur.

As mentioned above, while exemplary embodiments of the present invention have been described in connection with various computing devices and network architectures, the underlying concepts may be applied to any computing device or system in which it is desirable to reconstruct signals from point samples with minimal error. Thus, the techniques for providing improved signal processing in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent parametrization achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

Appendix A: Derivation of Signal-Stretch Metric

As explained in the body of the specification, signal approximation error is the difference between the function h and its reconstruction $\tilde{h}$ from a discrete sampling of the texture domain $D$. In this appendix, it is shown that the squared pointwise error gives rise to the norm $E_{h(s,t)}=1/3$ $tr(M_h(s,t))$ under the assumptions of piecewise constant reconstruction and asymptotically dense sampling.

Figure 12:
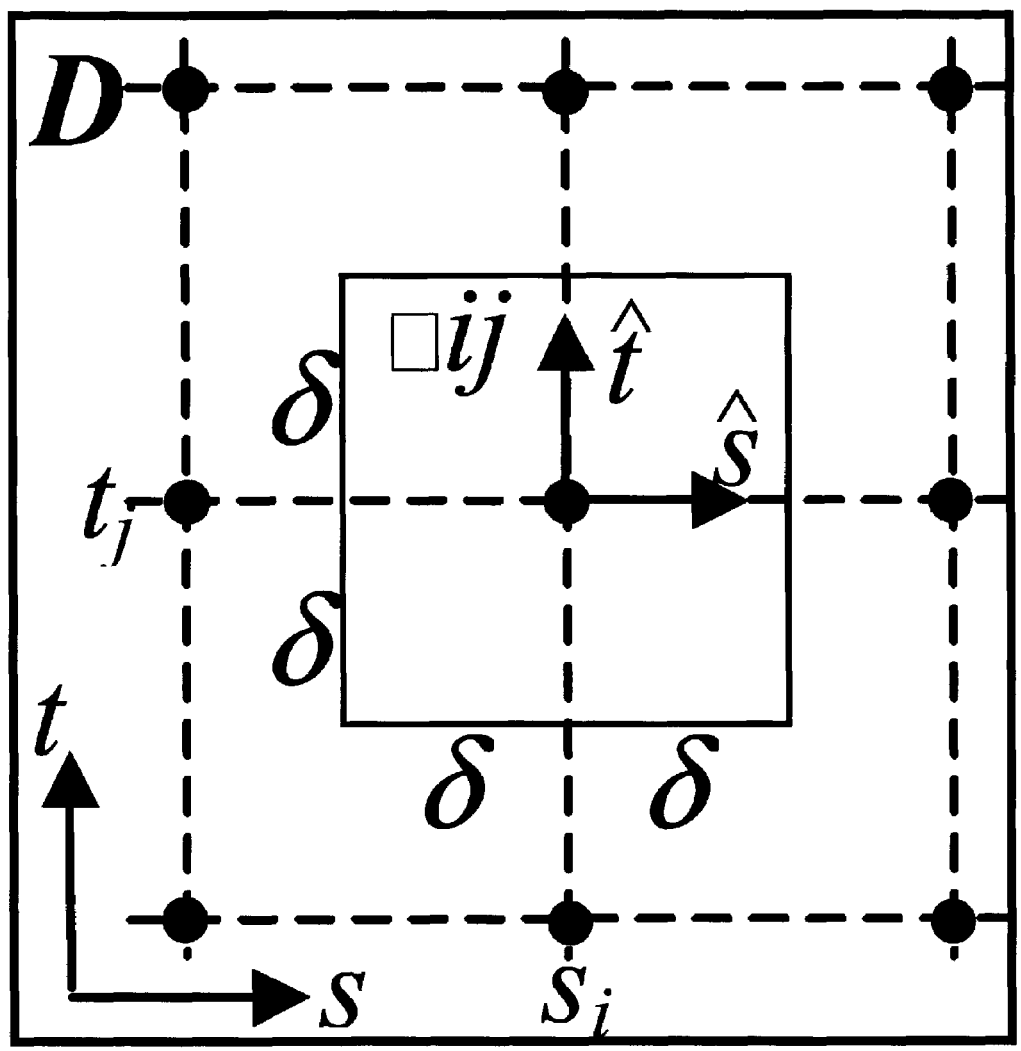
FIG. 12 is a block diagram referenced in Appendix A in connection with the derivation of the signal approximation error used to compare algorithms in accordance with the invention.

It is assumed that the domain $D$ contains a regular grid of sample points $(s_i, t_j)$, spaced $2\delta$ apart on each axis. As shown in FIG. 12, let $(\hat{s}, \hat{t}) \in [-\delta, +\delta] \times [-\delta, +\delta]$ be a local coordinate system within the grid square $\square$ ij about each sample such that $(s,t) = (s_i+\hat{s}, t_j+\hat{t}) \in \square ij$.

Perhaps the simplest reconstruction function $\tilde{h}_{ij}(s,t) = h(s_i, t_j)$. With this reconstruction function, the pointwise squared error can be expressed as $$E_h(s,t) = \|\tilde{h}_{ij}(s,t)\|^2$$

$$= \|h(s_i+\hat{s}, t_j+\hat{t}) - h(s_i, t_j)\|^2.$$

Using a Taylor expansion about $(s_i, t_j)$, $E_h$ can be rewritten as:

$$E_h(s,t) = E_{\square ij}(\hat{s}, \hat{t}) + O(\delta^3)$$

where the first term is defined via:

$$E_{\square ij}(\hat{s}, \hat{t}) = \left\| [h_s(s_i, t_j) \ h_t(s_i, t_j)] \begin{bmatrix} \hat{s} \\ \hat{t} \end{bmatrix} \right\|^2 = \left\| J_h(s_i, t_j) \begin{bmatrix} \hat{s} \\ \hat{t} \end{bmatrix} \right\|^2$$

$$= [\hat{s} \ \hat{t}] M_h(s_i, t_j) \begin{bmatrix} \hat{s} \\ \hat{t} \end{bmatrix} = [\hat{s} \ \hat{t}] \begin{bmatrix} a_h & b_h \\ b_h & c_h \end{bmatrix} \begin{bmatrix} \hat{s} \\ \hat{t} \end{bmatrix}.$$

The average squared error over the grid square $\square$ ij is then:

$$\bar{E}_{\square ij} = \frac{1}{4\delta^2} \int_{-\delta}^{+\delta} \int_{-\delta}^{+\delta} (E_{\square ij}(\hat{s}, \hat{t}) + O(\delta^3)) d\hat{s} d\hat{t}$$

$$= \delta^2 \left( \frac{1}{3} a_h + \frac{1}{3} c_h \right) + O(\delta^3).$$

Normally, the squared error integrated over surface area is of interest. The integral here ignores the variation of differential area $dA_s$ $(\hat{s}, \hat{t})$ within the grid square $\square$ ij, but that variation is insignificant for our asymptotic analysis ($\delta \to 0$).

The error converges to 0 at a rate $O(\delta^2)$. Thus, neglecting the higher-order terms $O(\delta^3)$, a measure of approximation error with piecewise constant reconstruction as $\delta \to 0$ is as follows:

$$E_h(s, t) = \frac{\delta^2}{3} tr(M_h(s, t)).$$

While this analysis assumes h is continuously differentiable over $D$, the analysis can also be applied heuristically to other functions such as piecewise linear ones.

What is claimed is:

1. A method for optimizing signal stretch of a parametrization scheme in connection with computer graphics, comprising:
   parametrizing a mesh utilizing a signal stretch metric, wherein the signal stretch metric is used to measure a plurality of signal stretch metric values corresponding to how much undersampling exists for different points on the surface of the mesh in accordance with both spatial relationships of the mesh and the signal on the surface of the mesh;
   minimizing the plurality of signal stretch metric values to minimize undersampling over all points for the surface of the mesh;
   for each face of the mesh, pre-computing integrated metric tensors (IMTs) based on signal stretch characteristics of the original mesh faces of the chart; and
   optimizing the plurality of signal stretch metric values computed from the IMTs by updating individual vertex positions of the chart, wherein said optimizing includes updating individual vertex positions of the chart using line searches.

2. A method according to claim 1, wherein the plurality of signal stretch metric values are measured by integrating a pointwise undersampling metric over the surface area of the mesh.

3. A method according to claim 2, wherein the signal stretch metric is based on at least one of a $L^2$ and $L^\infty$ norm, which correspond to the root-mean-square signal stretch over all directions in the domain and the maximum singular value obtained when mapping unit-length vectors from the texture domain to the signal, respectively.

4. A method according to claim 1, wherein said parametrizing includes:
for each face of each chart of an initial chart parametrization, pre-computing integrated metric tensors (IMTs) based on signal stretch characteristics of the original mesh faces of the chart.

5. A method according to claim 4, wherein said parametrizing further includes forming said initial chart parametrization based upon geometric characteristics of the original mesh.

6. A method according to claim 1, further including applying said parametrizing to each chart of a texture atlas to parametrize an arbitrary surface.

7. A method according to claim 6, further including finding a tightest bounding rectangle around each chart and packing the rectangles within texture space.

8. A method according to claim 6, further including isotropically scaling a chart by an area scalar factor.

9. A computer readable medium having stored thereon a plurality of computer-executable instructions for performing the method of claim 1.

10. A modulated data signal carrying computer executable instructions for performing the method of claim 1.

11. A computing device comprising means for performing the method of claim 1.

12. A method for optimizing signal stretch of a parametrization scheme in connection with computer graphics, comprising:
pre-computing integrated metric tensors (IMTs) on the original mesh faces of a chart in accordance with a signal stretch metric, wherein the signal stretch metric is a measurement of how much undersampling exists at any point on the surface of the mesh in accordance with both spatial relationships of the mesh and the signal on the surface of the mesh;
re-computing at least one IMT based upon an affine transformation of at least one triangle of the chart associated with the vertex position; and
optimizing the signal stretch computed from the IMTs by updating individual vertex positions of the chart, wherein said optimizing includes updating individual vertex positions of the chart using line searches.

13. A method according to claim 12, wherein the signal stretch metric is used to integrate a pointwise undersampling metric over the surface area of the mesh.

14. A method according to claim 13, wherein the signal stretch metric is based on at least one of a $L^2$ and $L^\infty$ norm, which correspond to the root-mean-square signal stretch over all directions in the domain and the maximum singular value obtained when mapping unit-length vectors from the texture domain to the signal, respectively.

15. A method according to claim 12, further including:
forming an initial chart parametrization based upon geometric characteristics of the original mesh.

16. A method according to claim 12, further including pre-computing and re-computing steps to each chart of a texture atlas to parametrize an arbitrary surface.

17. A method according to claim 16, further including finding a tightest bounding rectangle around each chart and packing the rectangles within texture space.

18. A method according to claim 16, further including isotropically scaling a chart by an area scalar factor.

19. A method according to claim 12, further including:
for each face of the mesh, deriving a signal stretch metric value from said at least one IMT;
multiplying each signal stretch metric value by the corresponding face's three-dimensional (3-D) area; and
summing said signal stretch metric values.

20. A method according to claim 19, further including generating a progressive mesh (PM) sequence based upon at least said deriving, multiplying and summing.

21. A computer readable medium having stored thereon a plurality of computer-executable instructions for performing the method of claim 12.

22. A modulated data signal carrying computer executable instructions for performing the method of claim 12.

23. A computing device comprising means for performing the method of claim 12.

* * * * *